(12) United States Patent
Nam et al.

(10) Patent No.: US 12,418,861 B2
(45) Date of Patent: Sep. 16, 2025

(54) WAKEUP SIGNALING RESOURCE OCCASIONS

(71) Applicant: QUALCOMM Incorporated, San Diego, CA (US)

(72) Inventors: Wooseok Nam, San Diego, CA (US); Tao Luo, San Diego, CA (US)

(*) Notice: Subject to any disclaimer, the term of this patent is extended or adjusted under 35 U.S.C. 154(b) by 280 days.

(21) Appl. No.: 17/684,138

(22) Filed: Mar. 1, 2022

(65) Prior Publication Data
US 2022/0264453 A1   Aug. 18, 2022

Related U.S. Application Data

(63) Continuation of application No. 16/592,675, filed on Oct. 3, 2019, now Pat. No. 11,297,569.

(60) Provisional application No. 62/742,227, filed on Oct. 5, 2018.

(51) Int. Cl.
*H04W 52/00* (2009.01)
*H04W 52/02* (2009.01)
*H04W 72/23* (2023.01)

(52) U.S. Cl.
CPC ... *H04W 52/0216* (2013.01); *H04W 52/0241* (2013.01); *H04W 72/23* (2023.01)

(58) Field of Classification Search
None
See application file for complete search history.

(56) References Cited

U.S. PATENT DOCUMENTS

| 10,524,206 B2 | 12/2019 | Agarwal et al. |
| 10,917,847 B2 | 2/2021 | Nam et al. |

(Continued)

FOREIGN PATENT DOCUMENTS

| WO | WO-2017052596 A1 | 3/2017 |
| WO | WO-2017100090 | 6/2017 |

(Continued)

OTHER PUBLICATIONS

International Preliminary Report on Patentability—PCT/US2019/054823, The International Bureau of WIPO—Geneva, Switzerland, Apr. 15, 2021.

(Continued)

*Primary Examiner* — Brandon M Renner

(57) ABSTRACT

Methods, systems, and devices for wireless communications are described. Some wireless communications systems support user equipment (UEs) achieving power savings by operating in a connected discontinuous reception (C-DRX) mode. The systems may additionally utilize wakeup signals for further power savings at a UE. For example, a UE may be configured with a wakeup signal resource configuration (e.g., a first search space configuration) for monitoring for wakeup signals while operating in a low power mode. This first search space configuration may be different from a second search space configuration for the UE operating in an active mode. When in a low power mode, the UE may monitor for wakeup signals according to the wakeup signal resource configuration. If the UE receives a wakeup signal in a wakeup signal resource defined by the configuration, the UE may initiate a wakeup procedure and transition to the active mode for data transmission and reception.

20 Claims, 19 Drawing Sheets

(56) References Cited

U.S. PATENT DOCUMENTS

| | | | |
|---|---|---|---|
| 2015/0003311 A1* | 1/2015 | Feuersaenger | H04W 52/0225 |
| | | | 370/311 |
| 2015/0003360 A1 | 1/2015 | Liu et al. | |
| 2018/0018185 A1 | 1/2018 | Sun et al. | |
| 2018/0270756 A1 | 9/2018 | Bhattad et al. | |
| 2018/0279274 A1* | 9/2018 | Sun | H04W 52/367 |
| 2018/0323909 A1 | 11/2018 | Ying et al. | |
| 2018/0339160 A1* | 11/2018 | Carroll | A61N 1/3756 |
| 2019/0254110 A1 | 8/2019 | He et al. | |
| 2019/0281552 A1 | 9/2019 | Hessler et al. | |
| 2019/0327679 A1 | 10/2019 | Gupta et al. | |
| 2020/0092813 A1 | 3/2020 | Kim et al. | |
| 2020/0100179 A1 | 3/2020 | Zhou et al. | |
| 2020/0112917 A1 | 4/2020 | Nam et al. | |
| 2020/0145921 A1 | 5/2020 | Zhang et al. | |
| 2020/0205075 A1 | 6/2020 | Nam et al. | |
| 2021/0058909 A1* | 2/2021 | Wong | H04W 72/23 |

FOREIGN PATENT DOCUMENTS

| | | |
|---|---|---|
| WO | WO-2018031327 A1 | 2/2018 |
| WO | WO-2018132100 A1 | 7/2018 |
| WO | WO-2020064930 A1 | 4/2020 |

OTHER PUBLICATIONS

International Search Report and Written Opinion—PCT/US2019/054823—ISA/EPO—Nov. 29, 2019.

QUALCOMM: "Wakeup Signaling for Multi-Beam Systems", 3GPP TSG-RAN WG2 Meeting RAN2 #99, 3GPP Draft, R2-1709116 Wakeup Signaling for Multi-Beam Systems, 3rd Generation Partnership Project (3GPP), Mobile Competence Centre, 650, Route Des Lucioles, F-06921 Sophia-Antipolis Cedex, France, vol. RAN WG2. No. Berlin, Germany, Aug. 21, 2017-Aug. 25, 2017, Aug. 20, 2017, 4 Pages, XP051318909, Retrieved from the Internet: URL: http://www.3gpp.org/ftp/Meetings_3GPP_SYNC/RAN2/Docs/ [retrieved on Aug. 20, 2017].

\* cited by examiner

200

WAKEUP SIGNALING RESOURCE OCCASIONS

CROSS REFERENCE

The present Application for Patent is a Continuation of U.S. patent application Ser. No. 16/592,675 by NAM et al., entitled "WAKEUP SIGNALING RESOURCE OCCASIONS" filed Oct. 3, 2019, which claims the benefit of U.S. Provisional Patent Application No. 62/742,227 by NAM et al., entitled "WAKEUP SIGNALING RESOURCE OCCASIONS," filed Oct. 5, 2018, assigned to the assignee hereof, and expressly incorporated herein.

BACKGROUND

The following relates generally to wireless communications, and more specifically to wakeup signaling resource occasions.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

Some wireless communications systems may support UEs operating in a discontinuous reception (DRX) mode (e.g., a connected DRX (C-DRX) mode), where a UE may transition between an active state for data transmission and reception and a sleep state for power conservation. The UE may determine if data is available by monitoring a control channel, such as a physical downlink control channel (PDCCH). The PDCCH may carry or otherwise convey an indication that a base station has data ready to transmit to the UE. In some cases, to reduce the frequency of the control channel monitoring, the UE may monitor for a wakeup signal using a low complexity receiver and may skip a control channel monitoring opportunity if no wakeup signal is received. However, in systems with a large number of UEs, UEs may detect wakeup signals intended for other UEs and may perform a wakeup procedure despite a base station not scheduling the UEs for any data communications. These UEs that wake up unnecessarily may experience reduced power savings due to the incorrectly identified wakeup signals.

SUMMARY

The described techniques relate to improved methods, systems, devices, and apparatuses that support wakeup signaling resource occasions. Generally, the described techniques provide for improved power savings at user equipment (UEs). Some wireless communications systems support UEs achieving power savings by operating in a connected discontinuous reception (C-DRX) mode. The systems may additionally utilize wakeup signals for further power savings at a UE. For example, a UE may be configured with a UE-specific or UE group-specific wakeup signal resource configuration (e.g., a first search space set configuration). This wakeup signal resource configuration may indicate a number of resource configuration parameters, such as time resource information, frequency resource information, decoding parameter information, beam sweeping information, or some combination of these parameters. When in a low power mode, the UE may monitor for wakeup signals according to the wakeup signal resource configuration and the corresponding parameters. If the UE receives a wakeup signal in a wakeup signal resource defined by the configuration, the UE may determine that the wakeup signal is intended for the UE (e.g., based on the configuration parameters). According to this determination, the UE may initiate a wakeup procedure and transition to an active mode for data transmission and reception. While in the active mode, the UE may monitor for downlink control information (DCI) messages according to a second search space set configuration different from the first search space set configuration. Additionally, while in the low power mode, if the UE detects a wakeup signal that does not correspond to the wakeup signal resource configuration for the UE, the UE may determine that the wakeup signal is intended for a different UE and may not wake up. In this way, UEs may better differentiate between wakeup signals transmitted by a base station, reducing the number of unnecessary wakeup procedures performed by the UEs and, correspondingly, improving the power savings at the UEs.

A method for wireless communication at a UE is described. The method may include receiving a first search space configuration for monitoring a downlink control channel while operating in a low power mode of the UE, receiving a second search space configuration for monitoring the downlink control channel while operating in an active mode of the UE, where the second search space configuration is different from the first search space configuration, and monitoring the downlink control channel according to the first search space configuration for a wakeup signal transmission based on the UE operating in the low power mode.

An apparatus for wireless communication at a UE is described. The apparatus may include a processor, memory coupled with the processor, and instructions stored in the memory. The instructions may be executable by the processor to cause the apparatus to receive a first search space configuration for monitoring a downlink control channel while operating in a low power mode of the UE, receive a second search space configuration for monitoring the downlink control channel while operating in an active mode of the UE, where the second search space configuration is different from the first search space configuration, and monitor the downlink control channel according to the first search space configuration for a wakeup signal transmission based on the UE operating in the low power mode.

Another apparatus for wireless communication at a UE is described. The apparatus may include means for receiving a first search space configuration for monitoring a downlink control channel while operating in a low power mode of the UE, receiving a second search space configuration for monitoring the downlink control channel while operating in an active mode of the UE, where the second search space configuration is different from the first search space configuration, and monitoring the downlink control channel according to the first search space configuration for a wakeup signal transmission based on the UE operating in the low power mode.

A non-transitory computer-readable medium storing code for wireless communication at a UE is described. The code may include instructions executable by a processor to receive a first search space configuration for monitoring a downlink control channel while operating in a low power mode of the UE, receive a second search space configuration for monitoring the downlink control channel while operating in an active mode of the UE, where the second search space configuration is different from the first search space configuration, and monitor the downlink control channel according to the first search space configuration for a wakeup signal transmission based on the UE operating in the low power mode.

Some examples of the method, apparatuses, and non-transitory computer-readable medium described herein may further include operations, features, means, or instructions for detecting a wakeup signal for the UE based on monitoring the downlink control channel according to the first search space configuration, initiating a wakeup procedure based on detecting the wakeup signal, and monitoring the downlink control channel subsequent to initiating the wakeup procedure according to the second search space configuration based on the UE operating in the active mode.

Some examples of the method, apparatuses, and non-transitory computer-readable medium described herein may further include operations, features, means, or instructions for detecting a grant from a serving base station based on monitoring the downlink control channel according to the second search space configuration and communicating with the serving base station based on the grant. Some other examples of the method, apparatuses, and non-transitory computer-readable medium described herein may further include operations, features, means, or instructions for initiating a sleep procedure based on determining that a grant has not been received within a defined amount of time from monitoring the downlink control channel according to the second search space configuration and monitoring the downlink control channel subsequent to initiating the sleep procedure according to the first search space configuration based on the UE operating in the low power mode.

In some examples of the method, apparatuses, and non-transitory computer-readable medium described herein, the downlink control channel may be monitored according to the first search space configuration using a low power receiver based on the UE operating in the low power mode and the downlink control channel may be monitored according to the second search space configuration using a standard receiver different from the low power receiver based on the UE operating in the active mode.

In some examples of the method, apparatuses, and non-transitory computer-readable medium described herein, the first search space configuration includes multiple control resource sets (CORESETs) in a bandwidth part (BWP), multiple control channel monitoring occasions within a transmission time interval (TTI), or both.

In some examples of the method, apparatuses, and non-transitory computer-readable medium described herein, the first search space configuration includes at least one resource configuration parameter and the monitoring the downlink control channel may be based on the at least one resource configuration parameter.

In some examples of the method, apparatuses, and non-transitory computer-readable medium described herein, the at least one resource configuration parameter indicates a starting symbol within a TTI, and where monitoring the downlink control channel further may include operations, features, means, or instructions for monitoring the downlink control channel according to the first search space configuration for the wakeup signal transmission beginning at the starting symbol within the TTI. In some examples of the method, apparatuses, and non-transitory computer-readable medium described herein, the at least one resource configuration parameter indicates a number of symbols within the TTI, and where monitoring the downlink control channel further may include operations, features, means, or instructions for monitoring the downlink control channel according to the first search space configuration for the wakeup signal transmission beginning within the TTI at the starting symbol and continuing for the number of symbols.

In some examples of the method, apparatuses, and non-transitory computer-readable medium described herein, the at least one resource configuration parameter may be a frequency resource configuration parameter, a time resource configuration parameter, or both, and where monitoring the downlink control channel further may include operations, features, means, or instructions for monitoring the downlink control channel according to the first search space configuration for the wakeup signal transmission based on the frequency resource configuration parameter, the time resource configuration parameter, or both. In some examples of the method, apparatuses, and non-transitory computer-readable medium described herein, the frequency resource configuration parameter may be a CORESET configuration parameter, the time resource configuration parameter indicates a control channel monitoring occasion within a TTI, or both.

In some examples of the method, apparatuses, and non-transitory computer-readable medium described herein, the at least one resource configuration parameter indicates a scrambling sequence, a DCI format, a radio network temporary identifier (RNTI), or a combination thereof, and where monitoring the downlink control channel further may include operations, features, means, or instructions for decoding the wakeup signal transmission based on the scrambling sequence, the DCI format, the RNTI, or a combination thereof.

A method for wireless communication at a base station is described. The method may include configuring a UE with a first search space configuration for monitoring a downlink control channel while operating in a low power mode, configuring the UE with a second search space configuration for monitoring the downlink control channel while operating in an active mode, where the second search space configuration is different from the first search space configuration, and transmitting, to the UE, a wakeup signal transmission using a wakeup signal resource according to the first search space configuration based on the UE operating in the low power mode.

An apparatus for wireless communication at a base station is described. The apparatus may include a processor, memory coupled with the processor, and instructions stored in the memory. The instructions may be executable by the processor to cause the apparatus to configure a UE with a first search space configuration for monitoring a downlink control channel while operating in a low power mode, configure the UE with a second search space configuration for monitoring the downlink control channel while operating in an active mode, where the second search space configuration is different from the first search space configuration, and transmit, to the UE, a wakeup signal transmission using a wakeup signal resource according to the first search space configuration based on the UE operating in the low power mode.

Another apparatus for wireless communication at a base station is described. The apparatus may include means for configuring a UE with a first search space configuration for monitoring a downlink control channel while operating in a low power mode, configuring the UE with a second search space configuration for monitoring the downlink control channel while operating in an active mode, where the second search space configuration is different from the first search space configuration, and transmitting, to the UE, a wakeup signal transmission using a wakeup signal resource according to the first search space configuration based on the UE operating in the low power mode.

A non-transitory computer-readable medium storing code for wireless communication at a base station is described. The code may include instructions executable by a processor to configure a UE with a first search space configuration for monitoring a downlink control channel while operating in a low power mode, configure the UE with a second search space configuration for monitoring the downlink control channel while operating in an active mode, where the second search space configuration is different from the first search space configuration, and transmit, to the UE, a wakeup signal transmission using a wakeup signal resource according to the first search space configuration based on the UE operating in the low power mode.

Some examples of the method, apparatuses, and non-transitory computer-readable medium described herein may further include operations, features, means, or instructions for transmitting, to the UE and subsequent to transmitting the wakeup signal transmission, a grant using a resource according to the second search space configuration based on the UE operating in the active mode subsequent to transmitting the wakeup signal transmission and communicating with the UE based on the grant.

In some examples of the method, apparatuses, and non-transitory computer-readable medium described herein, configuring the UE with the first search space configuration, configuring the UE with the second search space configuration, or both further may include operations, features, means, or instructions for transmitting, to the UE, configuration signaling configuring the UE with the first search space configuration, the second search space configuration, or both.

In some examples of the method, apparatuses, and non-transitory computer-readable medium described herein, the first search space configuration includes multiple CORESETs in a BWP, multiple control channel monitoring occasions within a TTI, or both.

In some examples of the method, apparatuses, and non-transitory computer-readable medium described herein, the first search space configuration includes at least one resource configuration parameter, and the transmitting the wakeup signal transmission may be based on the at least one resource configuration parameter.

In some examples of the method, apparatuses, and non-transitory computer-readable medium described herein, the at least one resource configuration parameter indicates a starting symbol within a TTI, and where transmitting the wakeup signal transmission further may include operations, features, means, or instructions for transmitting the wakeup signal transmission using the wakeup signal resource beginning at the starting symbol within the TTI. In some examples of the method, apparatuses, and non-transitory computer-readable medium described herein, the at least one resource configuration parameter indicates a number of symbols within the TTI, and where transmitting the wakeup signal transmission further may include operations, features, means, or instructions for transmitting the wakeup signal transmission using the wakeup signal resource beginning within the TTI at the starting symbol and continuing for the number of symbols.

In some examples of the method, apparatuses, and non-transitory computer-readable medium described herein, the at least one resource configuration parameter indicates a frequency resource configuration parameter, a time resource configuration parameter, or both, and where transmitting the wakeup signal transmission further may include operations, features, means, or instructions for transmitting the wakeup signal transmission using the wakeup signal resource based on the frequency resource configuration parameter, the time resource configuration parameter, or both.

In some examples of the method, apparatuses, and non-transitory computer-readable medium described herein, the at least one resource configuration parameter indicates a scrambling sequence, a DCI format, an RNTI, or a combination thereof, and where transmitting the wakeup signal transmission further may include operations, features, means, or instructions for transmitting the wakeup signal transmission using the wakeup signal resource based on the scrambling sequence, the DCI format, the RNTI, or a combination thereof.

A method for wireless communication at a UE is described. The method may include receiving configuration signaling configuring the UE with a set of wakeup signal resource configurations, receiving a configuration indicator indicating a first wakeup signal resource configuration of the set of wakeup signal resource configurations, and monitoring a wakeup signal resource for a wakeup signal transmission based on the first wakeup signal resource configuration.

An apparatus for wireless communication at a UE is described. The apparatus may include a processor, memory in electronic communication with the processor, and instructions stored in the memory. The instructions may be executable by the processor to cause the apparatus to receive configuration signaling configuring the UE with a set of wakeup signal resource configurations, receive a configuration indicator indicating a first wakeup signal resource configuration of the set of wakeup signal resource configurations, and monitor a wakeup signal resource for a wakeup signal transmission based on the first wakeup signal resource configuration.

Another apparatus for wireless communication at a UE is described. The apparatus may include means for receiving configuration signaling configuring the UE with a set of wakeup signal resource configurations, receiving a configuration indicator indicating a first wakeup signal resource configuration of the set of wakeup signal resource configurations, and monitoring a wakeup signal resource for a wakeup signal transmission based on the first wakeup signal resource configuration.

A non-transitory computer-readable medium storing code for wireless communication at a UE is described. The code may include instructions executable by a processor to receive configuration signaling configuring the UE with a set of wakeup signal resource configurations, receive a configuration indicator indicating a first wakeup signal resource configuration of the set of wakeup signal resource configurations, and monitor a wakeup signal resource for a wakeup signal transmission based on the first wakeup signal resource configuration.

Some examples of the method, apparatuses, and non-transitory computer-readable medium described herein may further include operations, features, means, or instructions for indexing a table, based on the configuration indicator, for identifying at least one resource configuration parameter of the first wakeup signal resource configuration. In some examples of the method, apparatuses, and non-transitory computer-readable medium described herein, monitoring the wakeup signal resource may further include operations, features, means, or instructions for monitoring the wakeup signal resource for the wakeup signal transmission based on the at least one resource configuration parameter.

In some examples of the method, apparatuses, and non-transitory computer-readable medium described herein, the at least one resource configuration parameter indicates a starting symbol within a transmission time interval, and monitoring the wakeup signal resource further may include operations, features, means, or instructions for monitoring the wakeup signal resource for the wakeup signal transmission beginning at the starting symbol within the transmission time interval. In some examples of the method, apparatuses, and non-transitory computer-readable medium described herein, the at least one resource configuration parameter indicates a number of symbols within the transmission time interval, and monitoring the wakeup signal resource further may include operations, features, means, or instructions for monitoring the wakeup signal resource for the wakeup signal transmission beginning within the transmission time interval at the starting symbol and continuing for the number of symbols.

In some examples of the method, apparatuses, and non-transitory computer-readable medium described herein, the at least one resource configuration parameter may be a frequency resource configuration parameter, a time resource configuration parameter, or both, and monitoring the wakeup signal resource further may include operations, features, means, or instructions for monitoring the wakeup signal resource for the wakeup signal transmission based on the frequency resource configuration parameter, the time resource configuration parameter, or both. In some examples of the method, apparatuses, and non-transitory computer-readable medium described herein, the at least one resource configuration parameter may be the frequency resource configuration parameter, and the frequency resource configuration parameter may be a control resource set configuration parameter. In other examples of the method, apparatuses, and non-transitory computer-readable medium described herein, the at least one resource configuration parameter may be the time resource configuration parameter, and the time resource configuration parameter indicates a search space configuration and a control channel monitoring occasion within a transmission time interval. In some examples of the method, apparatuses, and non-transitory computer-readable medium described herein, the search space configuration indicates a transmission time interval periodicity and an offset indicating a number of transmission time intervals relative to a reference time.

In some examples of the method, apparatuses, and non-transitory computer-readable medium described herein, the at least one resource configuration parameter indicates a scrambling sequence, and monitoring the first wakeup signal resource further may include operations, features, means, or instructions for decoding the first wakeup signal resource based on the scrambling sequence. In some examples of the method, apparatuses, and non-transitory computer-readable medium described herein, the at least one resource configuration parameter indicates a DCI format, and monitoring the first wakeup signal resource further may include operations, features, means, or instructions for decoding the first wakeup signal resource based on the DCI format. In some examples of the method, apparatuses, and non-transitory computer-readable medium described herein, the at least one resource configuration parameter indicates a radio network temporary identifier, and monitoring the first wakeup signal resource further may include operations, features, means, or instructions for decoding the first wakeup signal resource based on the RNTI.

In some examples of the method, apparatuses, and non-transitory computer-readable medium described herein, the first wakeup signal resource configuration indicates a number of different beams by which a wakeup signal may be transmitted within a transmission time interval, and monitoring the wakeup signal resource further may include operations, features, means, or instructions for monitoring the wakeup signal resource for the wakeup signal transmission within the transmission time interval based on the number of different beams. In some examples of the method, apparatuses, and non-transitory computer-readable medium described herein, the first wakeup signal resource configuration indicates a beam repetition factor for at least one beam by which a wakeup signal may be transmitted within a transmission time interval, and monitoring the wakeup signal resource further may include operations, features, means, or instructions for monitoring the wakeup signal resource for the wakeup signal transmission within the transmission time interval based on the beam repetition factor.

In some examples of the method, apparatuses, and non-transitory computer-readable medium described herein, the first wakeup signal resource configuration indicates a beam pattern for at least one beam by which a wakeup signal may be transmitted within a transmission time interval, and monitoring the wakeup signal resource further may include operations, features, means, or instructions for monitoring the wakeup signal resource for the wakeup signal transmission within the transmission time interval based on the beam pattern. In some examples of the method, apparatuses, and non-transitory computer-readable medium described herein, the first wakeup signal resource configuration indicates a beam pattern for a set of different beams by which a wakeup signal may be transmitted within a transmission time interval, and monitoring the wakeup signal resource further may include operations, features, means, or instructions for monitoring the wakeup signal resource for the wakeup signal transmission within the transmission time interval based on the beam pattern.

In some examples of the method, apparatuses, and non-transitory computer-readable medium described herein, each wakeup signal resource configuration of the set of wakeup signal resource configurations corresponds to a different decoding hypothesis of a set of decoding hypotheses, and monitoring the wakeup signal resource further may include operations, features, means, or instructions for identifying a first decoding hypothesis of the set of decoding hypotheses based at least in part on the first wakeup signal configuration and monitoring the wakeup signal resource for the wakeup signal transmission based on the first decoding hypothesis. In some examples of the method, apparatuses, and non-transitory computer-readable medium described herein, each decoding hypothesis of the set of decoding hypotheses corresponds to a different beam pattern for at least one beam by which a wakeup signal may be transmitted within a transmission time interval.

In some examples of the method, apparatuses, and non-transitory computer-readable medium described herein, the first wakeup signal resource configuration may be a downlink control channel resource configuration.

In some examples of the method, apparatuses, and non-transitory computer-readable medium described herein, monitoring the wakeup signal resource further may include operations, features, means, or instructions for detecting a wakeup signal for the UE within the wakeup signal resource, initiating a wakeup procedure based on detecting the wakeup signal, and monitoring a control channel subsequent to initiating the wakeup procedure.

In some examples of the method, apparatuses, and non-transitory computer-readable medium described herein, monitoring the control channel further may include operations, features, means, or instructions for detecting, within the control channel, a grant from a serving base station and communicating based on the grant. In some examples of the method, apparatuses, and non-transitory computer-readable medium described herein, monitoring the control channel further may include operations, features, means, or instructions for initiating a sleep procedure based on determining that a grant has not been received within a defined amount of time.

In some examples of the method, apparatuses, and non-transitory computer-readable medium described herein, monitoring the control channel further may include operations, features, means, or instructions for identifying a control channel resource configuration of a serving base station and monitoring the control channel based on the control channel resource configuration. In some examples of the method, apparatuses, and non-transitory computer-readable medium described herein, the control channel resource configuration differs from the first wakeup signal resource configuration.

In some examples of the method, apparatuses, and non-transitory computer-readable medium described herein, monitoring the first wakeup signal resource further may include operations, features, means, or instructions for monitoring a downlink control channel for the wakeup signal transmission. In some examples of the method, apparatuses, and non-transitory computer-readable medium described herein, the first wakeup signal configuration may be a reference signal configuration.

A method for wireless communication at a base station is described. The method may include transmitting configuration signaling configuring a UE with a set of wakeup signal resource configurations, transmitting a configuration indicator indicating a first wakeup signal resource configuration of the set of wakeup signal resource configurations, and transmitting a wakeup signal transmission using a wakeup signal resource based on the first wakeup signal resource configuration.

An apparatus for wireless communication at a base station is described. The apparatus may include a processor, memory in electronic communication with the processor, and instructions stored in the memory. The instructions may be executable by the processor to cause the apparatus to transmit configuration signaling configuring a UE with a set of wakeup signal resource configurations, transmit a configuration indicator indicating a first wakeup signal resource configuration of the set of wakeup signal resource configurations, and transmit a wakeup signal transmission using a wakeup signal resource based on the first wakeup signal resource configuration.

Another apparatus for wireless communication at a base station is described. The apparatus may include means for transmitting configuration signaling configuring a UE with a set of wakeup signal resource configurations, transmitting a configuration indicator indicating a first wakeup signal resource configuration of the set of wakeup signal resource configurations, and transmitting a wakeup signal transmission using a wakeup signal resource based on the first wakeup signal resource configuration.

A non-transitory computer-readable medium storing code for wireless communication at a base station is described. The code may include instructions executable by a processor to transmit configuration signaling configuring a UE with a set of wakeup signal resource configurations, transmit a configuration indicator indicating a first wakeup signal resource configuration of the set of wakeup signal resource configurations, and transmit a wakeup signal transmission using a wakeup signal resource based on the first wakeup signal resource configuration.

In some examples of the method, apparatuses, and non-transitory computer-readable medium described herein, the configuration signaling indicates a configuration of a table that includes at least one resource configuration parameter for each wakeup signal resource configuration of the set of wakeup signal resource configurations.

In some examples of the method, apparatuses, and non-transitory computer-readable medium described herein, the first wakeup signal resource configuration indicates a starting symbol within a transmission time interval, and transmitting the wakeup signal transmission further may include operations, features, means, or instructions for transmitting the wakeup signal transmission using the wakeup signal resource beginning at the starting symbol within the transmission time interval. In some examples of the method, apparatuses, and non-transitory computer-readable medium described herein, the first wakeup signal resource configuration indicates a number of symbols within the transmission time interval, and transmitting the wakeup signal transmission further may include operations, features, means, or instructions for transmitting the wakeup signal transmission using the wakeup signal resource beginning within the transmission time interval at the starting symbol and continuing for the number of symbols.

In some examples of the method, apparatuses, and non-transitory computer-readable medium described herein, the first wakeup signal resource configuration indicates a frequency resource configuration parameter, a time resource configuration parameter, or both, and transmitting the wakeup signal transmission further may include operations, features, means, or instructions for transmitting the wakeup signal transmission using the wakeup signal resource based on the frequency resource configuration parameter, the time resource configuration parameter, or both.

In some examples of the method, apparatuses, and non-transitory computer-readable medium described herein, the first wakeup signal resource configuration indicates a DCI format, a scrambling sequence, an RNTI, or any combination thereof.

In some examples of the method, apparatuses, and non-transitory computer-readable medium described herein, the first wakeup signal resource configuration indicates a number of different beams by which a wakeup signal may be transmitted within a transmission time interval, and transmitting the wakeup signal transmission further may include operations, features, means, or instructions for transmitting the wakeup signal transmission using the wakeup signal resource within the transmission time interval based on the number of different beams. In some examples of the method, apparatuses, and non-transitory computer-readable medium described herein, the first wakeup signal resource configuration indicates a beam repetition factor for at least one beam by which a wakeup signal may be transmitted within a transmission time interval, and transmitting the wakeup signal transmission further may include operations, features, means, or instructions for transmitting the wakeup signal transmission using the wakeup signal resource within the transmission time interval based on the beam repetition factor.

In some examples of the method, apparatuses, and non-transitory computer-readable medium described herein, the first wakeup signal resource configuration indicates a beam pattern for at least one beam by which a wakeup signal may be transmitted within a transmission time interval, and transmitting the wakeup signal transmission further may include operations, features, means, or instructions for transmitting the wakeup signal transmission using the wakeup signal resource within the transmission time interval based on the beam pattern. In some examples of the method, apparatuses, and non-transitory computer-readable medium described herein, the first wakeup signal resource configuration indicates a beam pattern for a set of different beams by which a wakeup signal may be transmitted within a transmission time interval, and transmitting the wakeup signal transmission further may include operations, features, means, or instructions for transmitting the wakeup signal transmission using the wakeup signal resource within the transmission time interval based on the beam pattern.

In some examples of the method, apparatuses, and non-transitory computer-readable medium described herein, each wakeup signal resource configuration of the set of wakeup signal resource configurations corresponds to a different decoding hypothesis of a set of decoding hypotheses. In some examples of the method, apparatuses, and non-transitory computer-readable medium described herein, each decoding hypothesis of the set of decoding hypotheses corresponds to a different beam pattern for at least one beam by which a wakeup signal may be transmitted within a transmission time interval.

In some examples of the method, apparatuses, and non-transitory computer-readable medium described herein, the first wakeup signal resource may be a downlink control channel. In some examples of the method, apparatuses, and non-transitory computer-readable medium described herein, the first wakeup signal resource configuration may be a reference signal resource configuration. In other examples of the method, apparatuses, and non-transitory computer-readable medium described herein, the first wakeup signal resource configuration may be a downlink control channel resource configuration.

DETAILED DESCRIPTION

Figure 1:
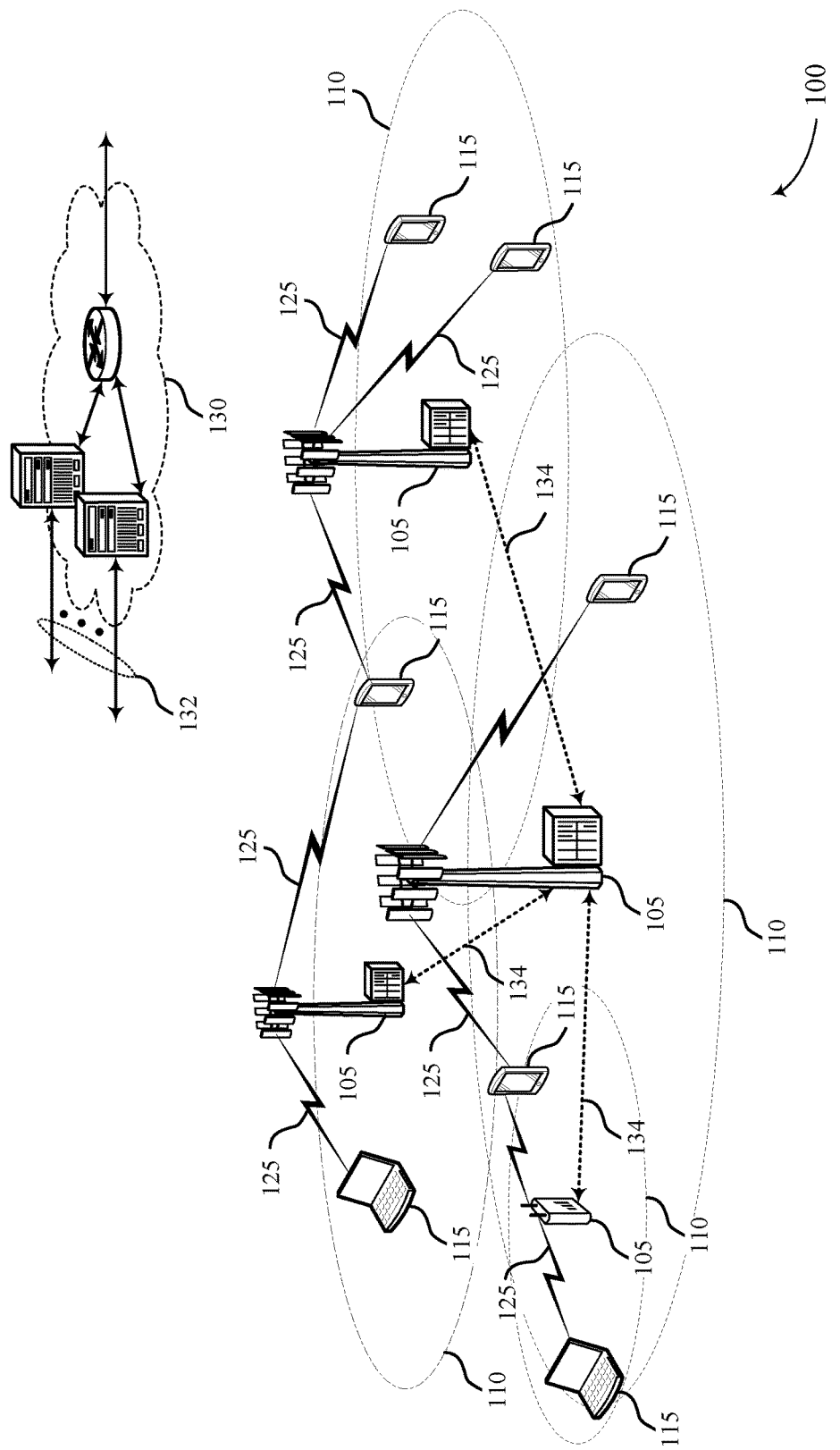
FIGS. 1 and 2 illustrate examples of wireless communications systems that support wakeup signaling resource occasions in accordance with aspects of the present disclosure.

Some wireless communications systems (e.g., millimeter wave (mmW) systems) may support user equipment (UEs) operating in a discontinuous reception (DRX) mode (e.g., a connected DRX (C-DRX) mode). In a C-DRX mode, a UE may transition between an active state for data transmission and reception and a sleep state for power conservation. The UE may determine if data is available by monitoring a control channel, such as a physical downlink control channel (PDCCH). The PDCCH may carry or otherwise convey an indication that a base station has data ready to transmit to the UE or is scheduling the UE for data transmission. In some cases, to reduce the frequency of the control channel monitoring, the UE may monitor for a wakeup signal using a low complexity receiver while in a low power mode. If the UE detects a wakeup signal transmitted by the base station (e.g., on a downlink control channel or another channel), the UE may transition to a higher power mode to monitor the control channel for scheduling information. However, if the UE does not detect a wakeup signal transmitted by the base station, the UE may skip a full-power control channel monitoring opportunity and instead return to a deep sleep mode, improving the power savings at the UE.

In some cases, a base station may serve a large number of UEs within a cell. In order to efficiently use wakeup signals, the base station may differentiate the wakeup signals intended for each UE or group of UEs based on wakeup signal resource configurations. For example, each UE or group of UEs may be configured with a specific wakeup signal resource configuration, where the wakeup signal resource configuration indicates how the UE or group of UEs monitors for wakeup signals, decodes wakeup signals, or both. If the UE or group of UEs detects a wakeup signal transmitted according to the wakeup signal resource configuration for that UE or group of UEs, the UE or group of UEs may initiate a wakeup procedure according to the wakeup signal. However, if a UE detects a wakeup signal transmitted according to a different wakeup signal resource configuration, the UE may determine that the wakeup signal is intended for a different UE or group of UEs and may not perform the wakeup procedure.

A wakeup signal resource configuration may indicate a number of resource configuration parameters. These resource configuration parameters may include time resource information (e.g., a start symbol index and a duration for a monitoring period), frequency resource information, decoding parameter information (e.g., a scrambling sequence, downlink control information (DCI) format, radio network temporary identifier (RNTI), decoding hypothesis, or some combination of these for successfully decoding a wakeup signal), beam sweeping information (e.g., a number of beams, beam repetition factors, beam patterns, etc.), or some combination of these parameters or other relevant parameters. If the UE receives a wakeup signal in a monitoring occasion defined by the wakeup signal resource configuration and successfully decodes the wakeup signal according to decoding parameters defined by the wakeup signal resource configuration, the UE may determine that the wakeup signal is intended for the UE. Accordingly, the UE may perform a wakeup procedure to transition to a higher power mode and monitor for scheduling information. In this higher power mode (e.g., an active power mode), the UE may operate according to different configurations than the wakeup signal resource configuration. For example, the wakeup signal resource configuration may be a first search space configuration (e.g., a first search space set) and the active power mode configuration may be a second search space configuration (e.g., a second search space set).

Aspects of the disclosure are initially described in the context of wireless communications systems. Additional aspects of the disclosure are described with respect to timelines (e.g., a UE operating timeline, a power level timeline for a UE, a wakeup procedure timeline, etc.), configurations for wakeup signal resources, and a process flow. Aspects of the disclosure are further illustrated by and described with reference to apparatus diagrams, system diagrams, and flowcharts that relate to wakeup signaling resource occasions.

FIG. 1 illustrates an example of a wireless communications system 100 that supports wakeup signaling resource occasions in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation (CA) configuration in conjunction with component carriers (CCs) operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP)

layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30{,}720{,}000$ seconds. Time intervals of a communications resource may be organized according to radio frames each having a duration of 10 milliseconds (ms), where the frame period may be expressed as $T_f=307{,}200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as CA or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

Some wireless communications systems 100 (e.g., mmW systems) may support UEs 115 operating in a C-DRX mode. In a C-DRX mode, a UE 115 may transition between an active state (e.g., an active mode) for data transmission and reception and a sleep state (e.g., an inactive or low power mode) for power conservation. The UE 115 may determine if data is available by monitoring a control channel, such as a PDCCH. The PDCCH may carry or otherwise convey an indication that a base station 105 has data ready to transmit to the UE 115 or is scheduling the UE 115 for data transmission. In some cases, to reduce the frequency of control channel monitoring, the UE 115 may monitor for a wakeup signal using a low complexity receiver while in a low power mode. If the UE 115 detects a wakeup signal transmitted by the base station 105, the UE 115 may transition to a higher power mode to monitor the control channel for scheduling information. However, if the UE 115 does not detect a wakeup signal transmitted by the base station 105, the UE 115 may skip a control channel monitoring opportunity and instead return to a deep sleep mode, improving the power savings at the UE 115.

In some cases, a base station 105 may serve a large number of UEs 115 within a cell. In order to efficiently use wakeup signals, the base station 105 may differentiate the wakeup signals intended for each UE 115 or group of UEs 115 based on wakeup signal resource configurations. For example, each UE 115 may be configured with a specific wakeup signal resource configuration, where the wakeup signal resource configuration indicates how the UE 115 monitors for wakeup signals, decodes wakeup signals, or both. If the UE 115 detects a wakeup signal transmitted according to the wakeup signal resource configuration for that UE 115, the UE 115 may initiate a wakeup procedure according to the wakeup signal. However, if a UE 115 detects a wakeup signal transmitted according to a different wakeup signal resource configuration, the UE 115 may determine that the wakeup signal is intended for a different UE 115 or group of UEs 115 and may not perform the wakeup procedure.

A wakeup signal resource configuration may indicate a number of resource configuration parameters. These resource configuration parameters may include time resource information (e.g., a start symbol index and a duration for a monitoring window), frequency resource information for a monitoring window, decoding parameter information (e.g., a scrambling sequence, DCI format, RNTI, decoding hypothesis, or some combination of these for successfully decoding a wakeup signal), beam sweeping information (e.g., a number of beams, beam repetition factors, beam patterns, etc., for receiving a wakeup signal), or some combination of these parameters or other relevant parameters. If the UE 115 receives a wakeup signal in a monitoring occasion defined by the wakeup signal resource configuration and successfully decodes the wakeup signal according to decoding parameters defined by the wakeup signal resource configuration, the UE 115 may determine that the wakeup signal is intended for the UE 115. Accordingly, the UE 115 may perform a wakeup procedure to transition to a higher power mode and monitor for scheduling information. In this higher power mode (e.g., an active power mode), the UE 115 may operate according to different configurations than the wakeup signal resource configuration. By differentiating wakeup signals for different UEs 115 using these wakeup signal resource configurations, a wireless communications system 100 may support improved power savings at the UEs 115.

Figure 2:
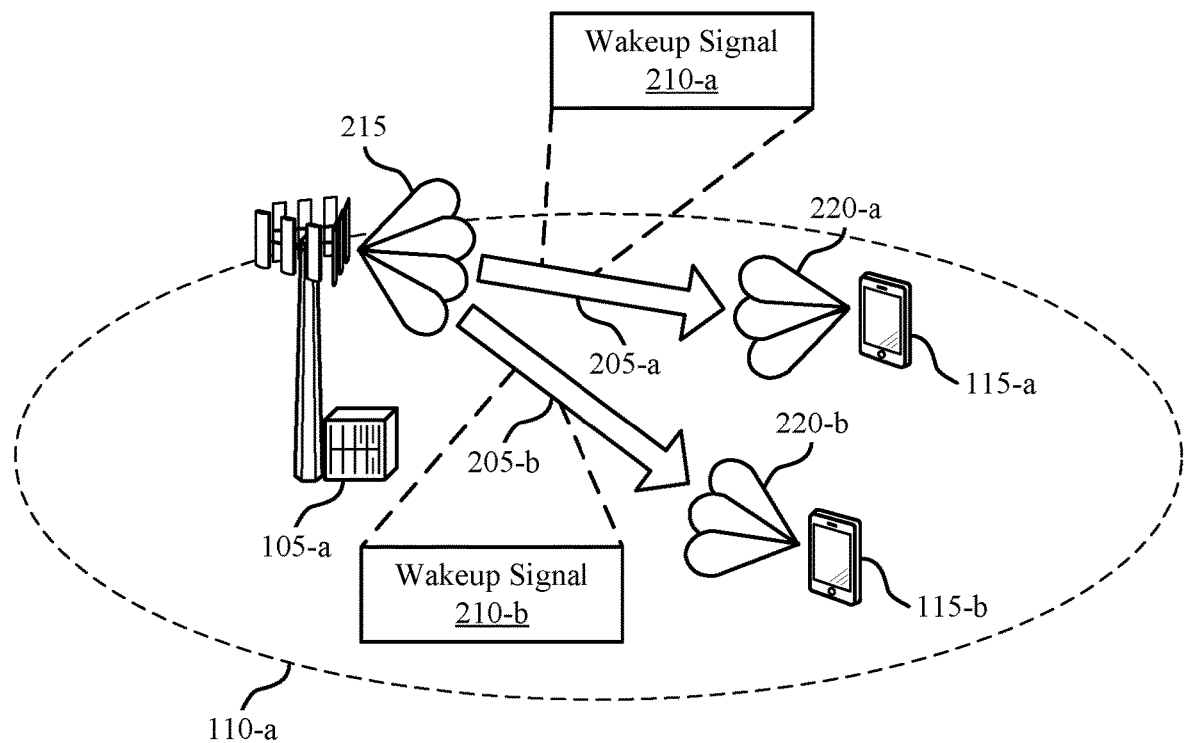

FIG. 2 illustrates an example of a wireless communications system 200 that supports wakeup signaling resource occasions in accordance with aspects of the present disclosure. The wireless communications system 200 may be an example of a wireless communications system 100 and may contain base station 105-*a*, UE 115-*a*, and UE 115-*b*, which may be examples of the corresponding wireless devices described with reference to FIG. 1. Base station 105-*a* may provide network coverage for UEs 115 within geographic coverage area 110-*a*. In some cases, UEs 115 may support C-DRX operation with wakeup signals 210 for improved power efficiency. For example, a UE 115 may operate in a low power mode until signaled, via a wakeup signal 210, to transition into a higher power mode to support data transmission and reception. These wakeup signals 210 may be examples of reference signal-type signals or PDCCH-type signals. UEs 115 (e.g., UE 115-*a* and UE 115-*b*) may differentiate between wakeup signals 210 transmitted by base station 105-a based on different parameters or configurations according to the type of wakeup signal 210.

In the wireless communications system 200 (e.g., an mmW system supporting beamforming), base station 105-a may transmit wakeup signals 210 using a beam sweeping procedure. For example, base station 105-a may transmit wakeup signals 210 on a downlink channel 205 (e.g., a downlink control channel) using a number of different downlink transmit beams 215. Base station 105-a may sweep through N different transmit beams for transmitting the wakeup signaling to improve the reception reliability at a UE 115. For example, when a UE 115 is in a low power mode (e.g., a sleep mode), the UE 115 may experience some level of beam degradation, such as beam misalignment, beam blocking, etc. To reduce the probability that the UE 115 misses a wakeup signal 210 transmitted by base station 105-a due to this beam degradation, the base station 105-a may use a variety of beam directions, beam widths, or both for transmitting the wakeup signal 210 to the UE 115. If the UE 115 successfully receives one or more of the wakeup signals 210 transmitted in the beam sweeping procedure, the UE 115 may perform a wakeup procedure and transition to a higher power level to support data transmission and reception. The number of downlink transmit beams, N, or the directions of the beams in the beam sweep may be dynamically determined by base station 105-a. UEs 115 may attempt to receive the wakeup signals 210 using a number of downlink receive beams 220. For example, UE 115-a may monitor for wakeup signaling using downlink receive beams 220-a and UE 115-b may monitor for wakeup signaling using downlink receive beams 220-b.

UEs 115 may be configured to receive wakeup signals 210 according to particular configuration parameters and a configuration framework. In some cases, a UE 115 may be pre-configured for a specific configuration framework, which may be referred to as a wakeup signal resource configuration. In other cases, base station 105-a may transmit an indication (e.g., a configuration indicator) of the configuration framework for the UE 115. In a first example, the configuration framework for a UE 115 may be an example of a downlink control channel (e.g., a PDCCH) resource configuration. For example, the downlink control channel resource configuration may include one or more control resource sets (CORESETs), one or more search spaces, one or more monitoring occasions, or a combination thereof. In a second example, the configuration framework for the UE 115 may be an example of a reference signal (e.g., a channel state information reference signal (CSI-RS), tracking reference signal (TRS), demodulation reference signal (DMRS), etc.) configuration.

Each wakeup signal 210 may either be a UE-specific or group-specific wakeup signal 210. For example, base station 105-a may transmit a UE-specific wakeup signal 210 to initiate a wakeup procedure at one particular UE 115. That is, each UE 115 may have a dedicated wakeup signal 210, dedicated signaling occasions, or both. This may result in a large network overhead (e.g., for base station 105-a to transmit wakeup signals 210 for each UE 115 scheduled to wake up) but highly flexible and efficient wakeup signaling for improved UE power saving. Base station 105-a may transmit wakeup signal 210-a on downlink channel 205-a to wake up UE 115-a and wakeup signal 210-b on downlink channel 205-b to wake up UE 115-b. If UE 115-b detects wakeup signal 210-a, UE 115-b may identify that the wakeup signal 210-a is intended for a different UE 115 and may not perform a wakeup procedure.

Alternatively, base station 105-a may transmit a group-specific wakeup signal 210 to wake up both UE 115-a and UE 115-b if both of these UEs 115 are in a same UE group. That is, each pre-defined or dynamically defined group of UEs 115 may share the same wakeup signal 210, signaling occasions, or both. This may result in a low network overhead, but one or more UEs 115 may wake up based on a group-specific wakeup signal 210 even if the wakeup signal 210 is intended for another UE 115 in the same group. A UE 115 waking up even if there is no data to transmit or receive based on a group-specific wakeup signal 210 may incur a power penalty.

To support a large number of UEs 115 within a cell (e.g., the geographic coverage area 110-a), UEs 115 or UE groups may share the available resources for monitoring wakeup signals 210. Base station 105-a may multiplex wakeup signals 210 such that the available resources are efficiently used to support wakeup procedures for multiple UEs 115 with minimal power penalties. That is, by configuring UEs 115 with different resources for wakeup occasions, base station 105-a may initiate wakeup procedures with different UEs 115 during small time windows without unnecessarily waking up other UEs 115 or groups of UEs 115.

Figure 3:
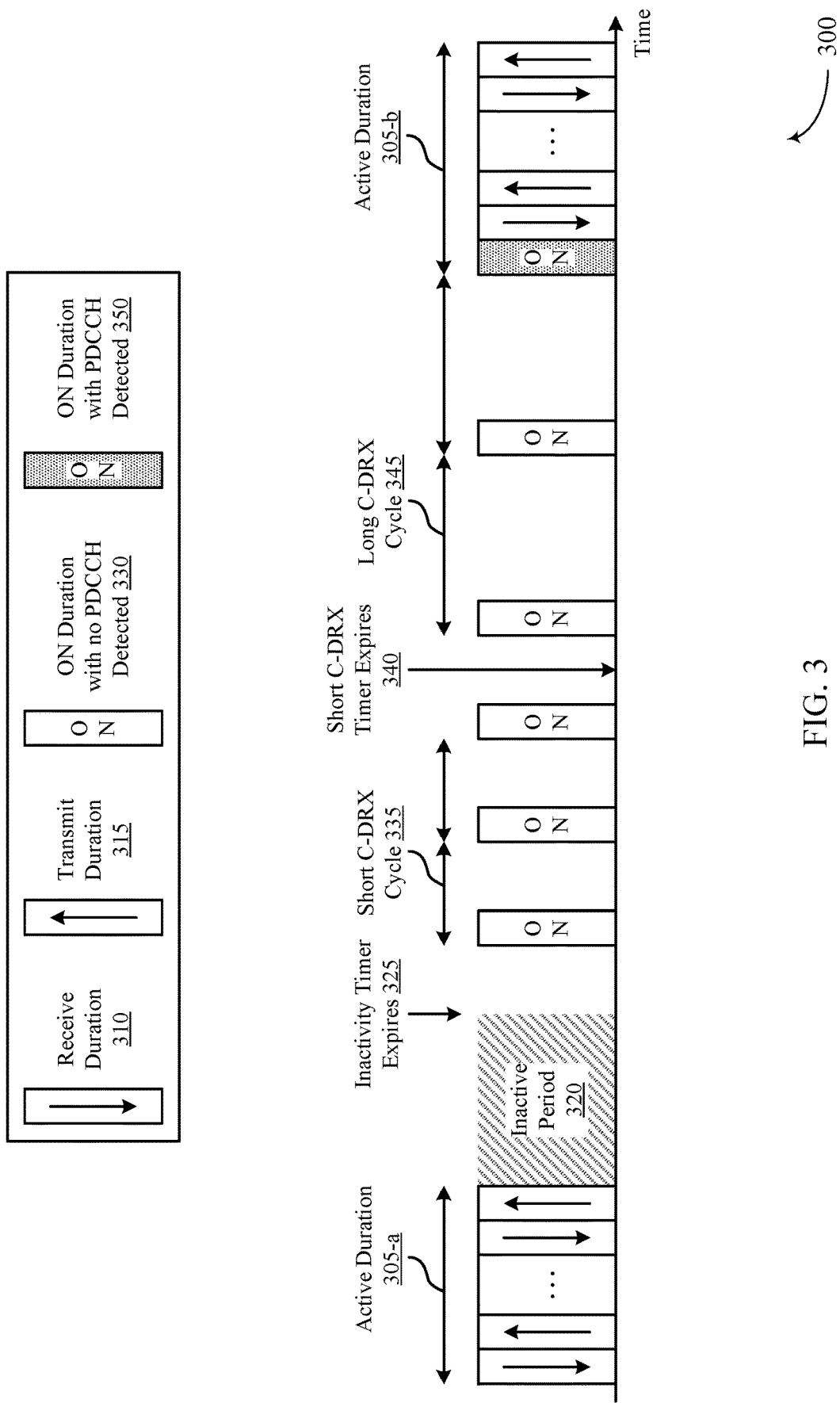
FIG. 3 illustrates an example of a user equipment (UE) operating timeline that supports wakeup signaling resource occasions in accordance with aspects of the present disclosure.

FIG. 3 illustrates an example of a UE operating timeline 300 that supports wakeup signaling resource occasions in accordance with aspects of the present disclosure. The UE operating timeline 300 may correspond to functionality performed by a UE 115 described with reference to FIGS. 1 and 2. The UE 115 may utilize C-DRX operations to achieve power savings during periods of traffic inactivity based on a capability or configuration of the UE 115. In some cases, the UE operating timeline 300 corresponds to UE operations in a legacy wireless communications system. For further power savings in a wireless communications system 100 or 200, a UE 115 may additionally support wakeup signals to trigger ramping-up power for UE "ON" durations.

A UE 115 may operate in a number of different power modes to support transmission and reception of data while achieving power savings. For example, in an active duration 305-a, a UE 115 may operate in a high or standard power mode (e.g., as compared to a low power mode or a sleep mode of the UE 115). During the active duration 305-a, the UE 115 may receive signals during any number of receive durations 310 and may transmit signals during any number of transmit durations 315. For example, the UE 115 may receive downlink data from a base station 105 using a receiver (e.g., a full-power or standard receiver), transmit uplink data to the base station 105, participate in D2D communications, or perform any combination of these operations. The UE 115 may remain in the high or standard power mode for an inactive period 320 following the active duration 305-a. During this inactive period, the UE 115 may not detect any PDCCH signaling. The UE 115 may initiate an inactivity timer at the start of the inactive period 320 (i.e., the end of the active duration 305-a). If the UE 115 receives additional signals (e.g., PDCCH signals) or transmits additional signals before expiration of the inactivity timer, the UE 115 may re-enter an additional active duration 305 and may reset the inactivity timer to restart at the end of this additional active duration 305. Otherwise, if the inactivity timer expires at 325, the UE 115 may ramp-down its power and enter a low power mode or sleep mode (e.g., a UE "OFF" duration). During an OFF duration, the UE 115 may not transmit or receive signals due to the current UE power level. In this way, during traffic inactivity, the UE 115 may switch to C-DRX operation to achieve significant power savings.

Based on configured C-DRX cycles, the UE 115 may periodically or aperiodically wake up from the low power mode into an ON duration. During the ON duration, the UE 115 may monitor the PDCCH for any signaling transmitted to the UE 115 (e.g., DCI messages, grants, etc.). If the UE 115 does not detect any PDCCH signaling for the UE 115, the UE 115 may return to an OFF duration (i.e., go back to sleep) for the remainder of the C-DRX cycle following the ON duration with no PDCCH detected 330. The UE 115 may then wake up for the next ON duration and repeat the PDCCH monitoring. The length of time between each ON duration may stay the same or change based on one or more timers. For example, the UE 115 may initially wake up from the OFF mode at regular intervals defined by a short C-DRX cycle 335. However, upon expiration of a short C-DRX timer at 340 (e.g., where the short C-DRX timer may be activated at the end of the inactive period 320), the UE 115 may switch from the short C-DRX cycle 335 to a long C-DRX cycle 345 for further power savings. During the long C-DRX cycles 345, the UE 115 may wake up periodically for ON durations, where the time intervals between ON durations for the long C-DRX cycles 345 are longer than the time intervals between ON durations during the short C-DRX cycles 335. In some cases, a UE 115 may support additional C-DRX cycle lengths and corresponding timers.

If, during an ON duration, the UE 115 detects a PDCCH signal for the UE 115, the UE 115 may perform a wakeup procedure and may terminate the C-DRX mode (e.g., either the short C-DRX mode or the long C-DRX mode). For example, the UE 115 may enter an active duration 305-*b* based on an ON duration with PDCCH detected 350. In some cases, the PDCCH signal may schedule data for the UE 115, and the UE 115 may operate according to a number of receive durations 310, transmit durations 315, or both during the active duration 305-*b* according to the data scheduling. The UE 115 may remain in the high or standard power mode for data transmission and reception during the active duration 305-*b*.

In some cases, the UE operating timeline 300 may be based on a number of configuration parameters for the UE 115. These configuration parameters may include an inactivity timer (e.g., a length of time for an inactive period 320, after which the UE 115 powers down), a short DRX timer (e.g., a length of time for operating according to a short C-DRX cycle 335 before switching to a long C-DRX cycle 345), a short DRX cycle (e.g., the length of the short C-DRX cycle 335 defining a first periodicity of ON durations), a long DRX cycle (e.g., the length of the long C-DRX cycle 345 defining a second periodicity of ON durations), or any combination of these or other relevant parameters for DRX operation. In some cases, a UE 115 may be pre-configured with these configuration parameters. In other cases, a base station 105 may configure the UE 115 with configuration parameters. Additionally, the durations, periods, and cycles described herein may span any length of time (e.g., a number of symbols, slots, subframes, frames, etc.) based on the UE or base station configuration.

To further improve the power savings at a UE 115, the UE 115 may implement wakeup signals in conjunction with C-DRX operations. Using the a low-power receiver, the UE 115 may monitor for wakeup signals to indicate subsequent data scheduling. To handle a large number of UEs operating within a wireless communications system, the UEs may be configured with specific wakeup signaling resource occasions and parameters. Using these parameters, a UE 115 may identify whether a wakeup signal is for that UE 115, and may not wake up based on wakeup signals intended for other UEs 115. In this way, a UE 115 may further achieve power savings by skipping ON durations if the UE 115 is not explicitly instructed to wake up by the base station 105.

Figure 4:
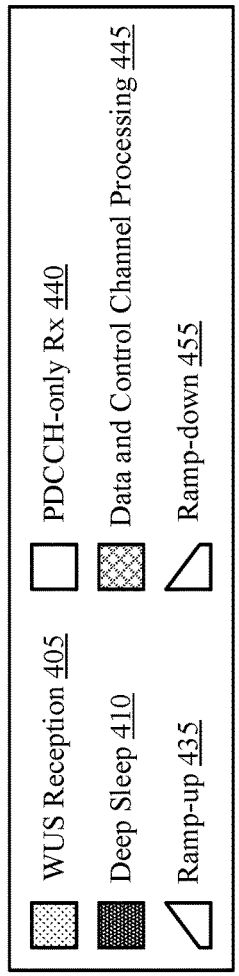
FIG. 4 illustrates an example of a power level timeline for a UE that supports wakeup signaling resource occasions in accordance with aspects of the present disclosure.
Figure 4:
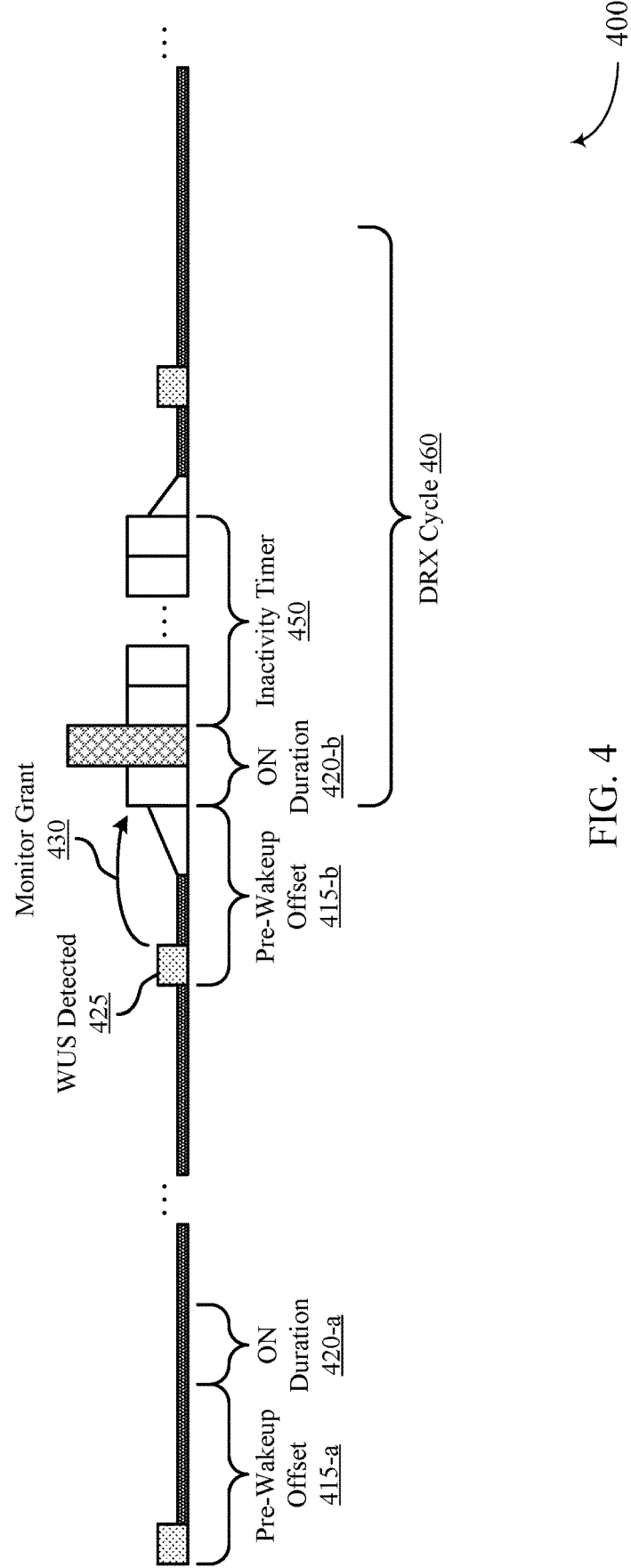

FIG. 4 illustrates an example of a power level timeline 400 for a UE 115 that supports wakeup signaling resource occasions in accordance with aspects of the present disclosure. The power level timeline 400 may correspond to approximate or relative power levels for different modes of operation at a UE 115, such as a UE 115 described with reference to FIGS. 1 through 3. The UE 115 may support additional power savings by implementing extended sleep functionality (e.g., as compared to the UE operating timeline 300 illustrated in FIG. 3). By supporting wakeup procedures based on wakeup signaling that may be received at a lower power level than PDCCH signaling (e.g., using a lower power receiver than the receiver used to receive the PDCCH signaling), the UE 115 may efficiently determine whether to wake up for data and control channel processing 445. As illustrated in FIG. 4, the height of each bar may indicate a relative power level for a UE 115 performing the corresponding operation, where a higher bar indicates a higher power level. For example, wakeup signal reception 405 may correspond to a slightly higher power level than a deep sleep 410 mode, but a lower power level than PDCCH-only reception 440 or data and control channel processing 445.

A UE 115 may turn on a wakeup subsystem for wakeup signal decoding while in a low power mode. This wakeup subsystem may be an example of a low complexity receiver, such as a simple correlator. As such, the wakeup subsystem may detect wakeup signals using a lower power than a receiver (i.e., a standard or "full-power" receiver) performing PDCCH decoding in an active mode. In some cases, a wakeup signal may be a special type of waveform, such as an on-off keying (OOK)-based tone, a preamble, a reference signal, etc. The UE 115 may perform wakeup signal reception 405 prior to a C-DRX ON duration 420. A pre-wakeup offset 415 may define a buffer period between the wakeup signal reception 405 and the ON duration 420 (e.g., for the UE 115 to process any received wakeup signal and perform a power ramp-up procedure 435). If the UE 115 does not detect a wakeup signal during wakeup signal reception 405 (e.g., if there is no downlink grant transmitted for the UE 115 at wakeup signal reception 405-*a* during the pre-wakeup offset 415-*a*), the UE 115 may skip an ON duration 420 (e.g., ON duration 420-*a*) and instead return to a deep sleep 410 mode until a next wakeup signal reception 415 opportunity. This wakeup signal reception 405 supporting extended deep sleep 410 durations may save power at the UE 115 by reducing the amount of PDCCH monitoring.

In some cases, the UE 115 may detect a wakeup signal during wakeup signal reception. Based on this wakeup signal detection 425, the UE 115 may perform a power ramp-up procedure 435 (e.g., during a pre-wakeup offset 415-*b*). This power ramp-up procedure 435 may transition the UE 115 from a first power level (e.g., a power level associated with a deep sleep 410 mode) to a second power level (e.g., a power level associated with a PDCCH-only reception 440 mode). The UE 115 may monitor for a grant 430 in the PDCCH-only reception 440 mode during an ON duration 420-*b*. This grant may be an example of a PDCCH grant scheduling data transmission or reception for the UE 115, and the grant may be indicated by the detected wakeup signal. For example, a base station 105 may transmit a wakeup signal to the UE 115 to indicate that the base station 105 is scheduled to transmit a PDCCH grant to the UE 115 during a next ON duration 420-*b*. The UE 115 may utilize a full modem for PDCCH reception and decoding, rather than the wakeup subsystem. For example, the UE 115 may wake up for the ON duration 420-b and may monitor for the PDCCH grant 430 using the full modem at a power level greater than the power level used for wakeup signal reception 405. Based on the received PDCCH grant 430, the UE 115 may determine a schedule for performing data and control channel processing 445, which may be performed at a different power level than the PDCCH-only reception 440. Following the data and control channel processing 445, the UE 115 may remain in an active mode and monitor for any further PDCCH signals. If the UE 115 does not receive a further PDCCH grant before an inactivity timer expires (e.g., the UE 115 is inactive for a certain threshold duration 450), the UE 115 may perform a power ramp-down procedure 455 to return to a deep sleep 410. The UE 115 may then periodically or aperiodically check for wakeup signals according to a DRX cycle 460. For example, wakeup signal reception 405 may occur near the end of a DRX cycle 460 such that the UE 115 may wake up for a next DRX cycle 460 if a wakeup signal is received.

The UE 115 may be configured with specific wakeup signaling resource occasions and parameters. Using these parameters, a UE 115 may identify whether a wakeup signal is for that UE 115, and may not wake up based on wakeup signals intended for other UEs 115. A base station 105 transmitting wakeup signals may differentiate between UEs 115 or groups of UEs 115 using these configuration parameters. In this way, a base station 105 may wake up a large number of UEs 115 within a same time window (e.g., a same wakeup signal reception 405 period) using the different wakeup configurations, supporting large amounts of data traffic in a system. Moreover, the different UE wakeup signaling configurations allows UEs 115 to remain asleep even when detecting wakeup signals for other UEs 115 (e.g., wakeup signals transmitted according to other configurations). In this way, even in systems with high levels of data traffic, UEs 115 may achieve significant power savings by remaining in deep sleep 410 mode until specifically indicated to wake up by a base station 105.

Figure 5:
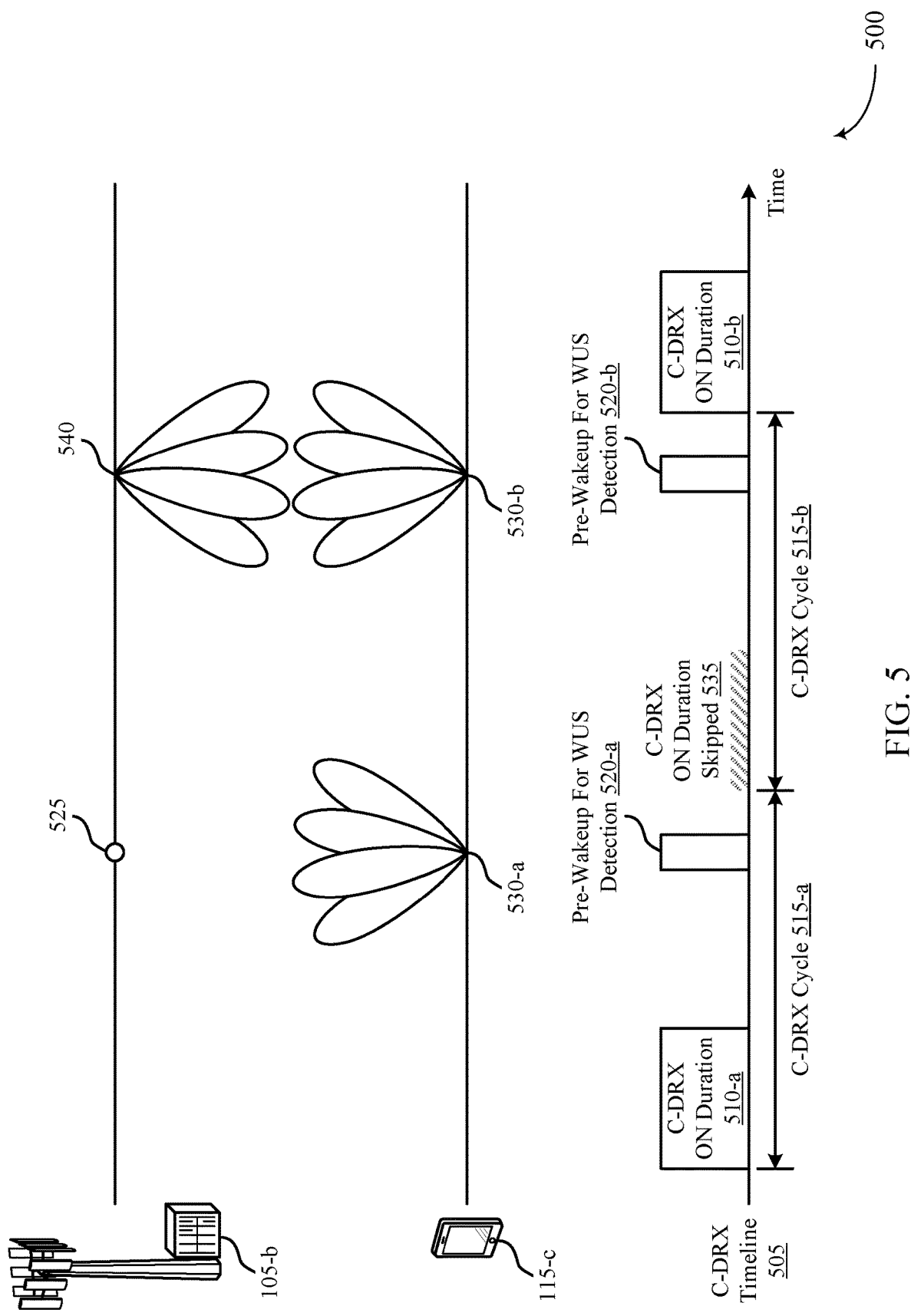
FIG. 5 illustrates an example of a wakeup procedure timeline for a wireless communications system that supports wakeup signaling resource occasions in accordance with aspects of the present disclosure.

FIG. 5 illustrates an example of a wakeup procedure timeline 500 for a wireless communications system that supports wakeup signaling resource occasions in accordance with aspects of the present disclosure. The wakeup procedure timeline 500 may correspond to wakeup signaling between base station 105-b and UE 115-c, which may be examples of the corresponding devices described with respect to FIGS. 1 through 4. Base station 105-b and UE 115-c may operate within a wireless communications system supporting beamforming, such as an mmW system. In some cases, UE 115-c may use a low power receiver for detecting wakeup signals transmitted by base station 105-b. Based on whether a wakeup signal is detected, UE 115-c may either return to a lower power mode (i.e., go back to sleep) or may transition to a higher power mode (i.e., wake up) to receive and/or transmit data.

A C-DRX timeline 505 illustrates the operations performed by UE 115-c. For example, during a first C-DRX ON duration 510-a corresponding to a first C-DRX cycle 515-a, UE 115-c may receive data from base station 105-b, transmit data to base station 105-b, perform other communication operations in an active mode, or any combination of these operations. Following the first C-DRX ON duration 510-a, UE 115-c may enter a low power mode (e.g., based on an inactivity timer). However, according to the C-DRX cycle 515 schedule, UE 115-c may periodically or aperiodically pre-wake up for wakeup signal detection 520-a. In some cases, a pre-wakeup procedure may involve UE 115-c transitioning to a higher power level than the sleep mode but a lower power level than the active mode to monitor for wakeup signals from base station 105-b.

In a first example, base station 105-b may not have data to transmit to UE 115-c or receive from UE 115-c. In this example, at 525, base station 105-b may not transmit a wakeup signal to UE 115-c. In some cases, base station 105-b may instead transmit one or more wakeup signals to other UEs 115 serviced by the base station 105-b. UE 115-c may monitor for wakeup signals using a set of downlink receive beams 530-a. If UE 115-c does not detect or otherwise receive a wakeup signal intended for UE 115-c on any of the downlink receive beams 530-a, the UE 115-c may skip a C-DRX ON duration at 535 for a C-DRX cycle 515-b and instead may return to the lower power mode (i.e., go back to sleep). In this way, UE 115-c may reduce its power consumption by not entering a C-DRX ON duration 510 when there is no data scheduled for reception or transmission.

In a second example, base station 105-b may identify data to transmit to UE 115-c or data to receive from UE 115-c. In this example, at 540, base station 105-b may transmit a wakeup signal to UE 115-c using a beam sweeping procedure (e.g., transmitting the wakeup signal using a number of downlink transmit beams). UE 115-c may pre-wake up for wakeup signal detection 520-b during C-DRX cycle 515-b and may attempt to detect the wakeup signal using a set of downlink receive beams 530-b, which may be the same or different from the set of downlink receive beams 530-a. If UE 115-c detects the wakeup signal on any of these downlink receive beams 530-b, the UE 115-c may perform a full wakeup procedure to transmit or receive the scheduled data in a C-DRX ON duration 510-b.

The downlink transmit beams, downlink receive beams, or both may be configured for improved detection at UE 115-c. For example, base station 105-b may use a set of $N_{Tx}$ beams (e.g., out of up to sixty-four synchronization signal block (SSB) beams) for wakeup signal transmission and UE 115-c may use a set of $N_{Rx}$ beams (e.g., out of up to sixty-four SSB beams) for wakeup signal reception. The numbers of beams, the directions of the beams, or both may be pre-configured for each wireless device or may be configured based on a configuration message or configuration function. For example, a configuration function for the beams may be based on a link quality, UE mobility, one or more UE capabilities, a C-DRX cycle 515 length, or some combination of these or other relevant parameters for wakeup signal reception. In some cases, the number and direction of downlink transmit beams, downlink receive beams, or both may be determined by base station 105-b for each UE 115 or group of UEs 115. Base station 105-b may use the determined number and direction of downlink transmit beams for a wakeup signal beam sweeping procedure. Additionally or alternatively, base station 105-b may transmit a configuration message to UE 115-c to indicate the determined number and direction of downlink receive beams for wakeup signal reception. In some cases, UE 115-c may not maintain beam information during OFF durations and may be pre-configured with default downlink receive beams to use during pre-wake up for wakeup signal detection 520.

In some cases, UE 115-c may be configured with other wakeup signal reception parameters. For example, these parameters may include values defining the pre-wake up for wakeup signal detection 520 time period, such as a starting symbol for the time period, a number of symbols corresponding to the duration of the time period, or other time resources. In other cases, the parameters may include decoding information for UE 115-c, such as a scrambling sequence, a DCI format, an RNTI value, a decoding hypothesis, or some combination of these. In some cases, the parameters indicated to UE 115-c may be based on a format of the wakeup signal. For example, PDCCH-type wakeup signals and reference signal-type wakeup signals may correspond to different sets of parameters. In some cases, base station 105-b may configured UE 115-c with wakeup signal reception parameters. UE 115-c may detect the wakeup signals intended for UE 115-c based on this wakeup signal monitoring configuration.

Figure 6:
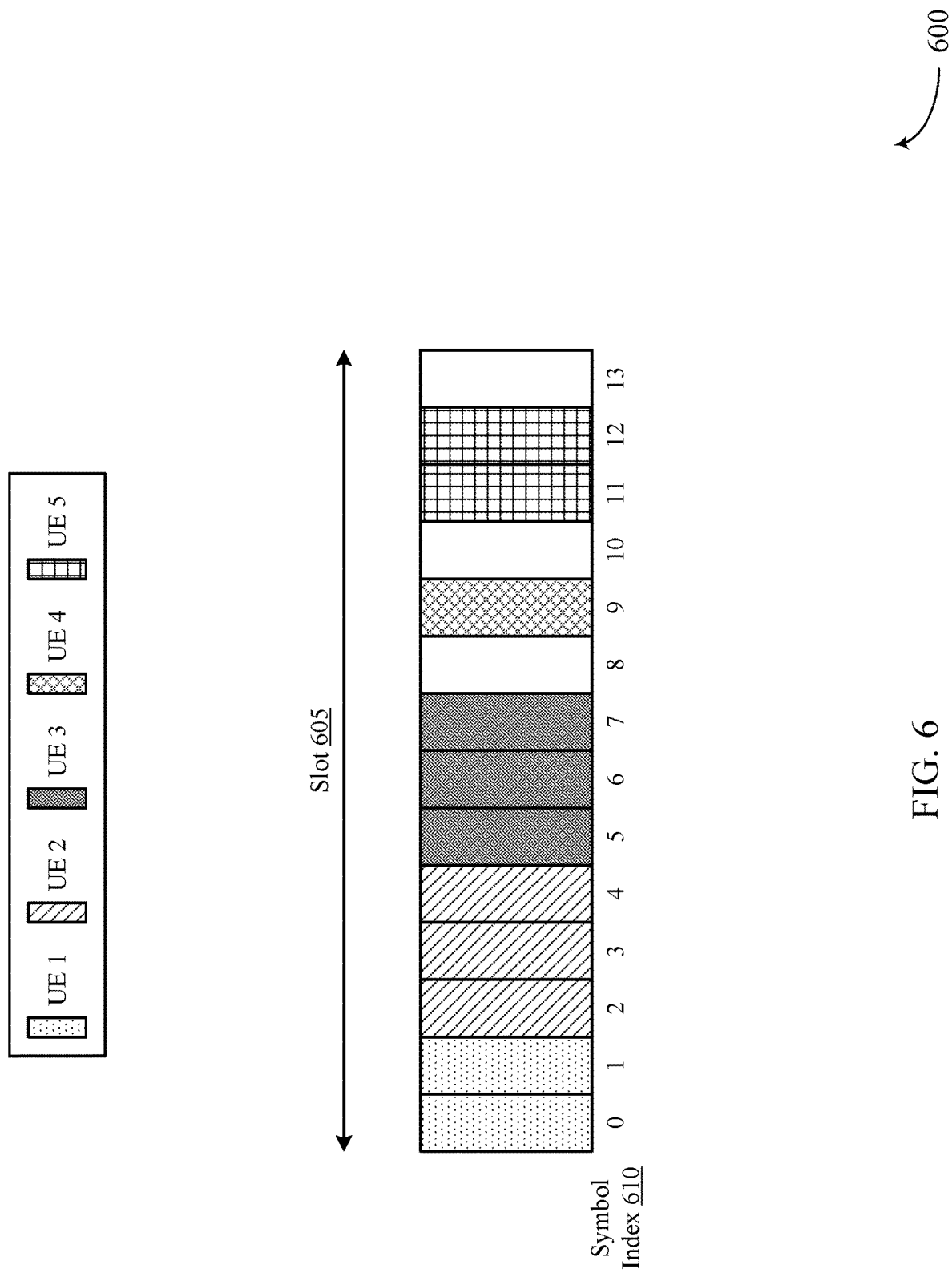
FIGS. 6 and 7 illustrate examples of configurations for wakeup signal resources that support wakeup signaling resource occasions in accordance with aspects of the present disclosure.

FIG. 6 illustrates a first example of a configuration for wakeup signal resources 600 that supports wakeup signaling resource occasions in accordance with aspects of the present disclosure. The configuration for wakeup signal resources 600 may correspond to a downlink control channel resource configuration, such as a PDCCH-type wakeup signal configuration. A base station 105 may use the configuration for wakeup signal resources 600 for differentiating wakeup signals between UEs 115 or groups of UEs 115. This base station 105 and these UEs 115 may be examples of the corresponding wireless devices described with reference to FIGS. 1 through 5. While the configuration for wakeup signal resources 600, as illustrated, shows one possible wakeup signal resource configuration, many other configurations are possible using any of the techniques described herein.

UEs 115 within a wireless communications system may monitor for wakeup signals in one or more wakeup signaling resource occasions according to configurations of the UEs 115. For example, a base station 105 may configure a UE 115 with a set of wakeup signal resource configurations. In some cases, the UE 115 may store the set of wakeup signal resource configurations in a lookup table in memory. The base station 105 may then transmit a configuration indicator to the UE 115 that indicates a specific wakeup signal resource configuration for the UE 115 to use for wakeup signal monitoring and reception. In another example, base station 105 may store the set of wakeup signal resource configurations in memory and may transmit an indication of one of the configurations to the UE 115.

Each wakeup signal resource configuration may include a set of configuration parameters. These configuration parameters may include time resources, frequency resources, a DCI format, a scrambling sequence, an RNTI, or any combination of these or other relevant configuration parameters for differentiating wakeup signals. Configuration parameters indicating time resource, frequency resources, or both may indicate to a UE 115 how to monitor for a wakeup signal transmitted to the UE 115. Configuration parameters indicating a DCI format, a scrambling sequence, or an RNTI may indicate to the UE 115 how to decode a wakeup signal transmitted to the UE 115. For example, if the UE 115 successfully decodes a wakeup signal according to the configured DCI format (e.g., if the decoded wakeup signal passes an error detection check (EDC), such as a CRC), the UE 115 may determine that the wakeup signal is intended for the UE 115. Similarly, if the UE 115 performs a descrambling process for a received wakeup signal according to the indicated scrambling sequence, the indicated RNTI, or both, and successfully decodes the wakeup signal based on this descrambling process, the UE 115 may use the received wakeup signal to initiate a wakeup procedure.

In one specific example, a base station 105 may store a wakeup signal resource configuration lookup table including time resources for different UEs 115 or sets of UEs 115:

TABLE 1

An Example of a Wakeup Signal
Resource Configuration Lookup Table

| UE | Starting Symbol | Number of PDCCH Symbols |
|----|-----------------|-------------------------|
| 1  | 0               | 2                       |
| 2  | 2               | 3                       |
| 3  | 5               | 3                       |
| 4  | 9               | 1                       |
| 5  | 11              | 2                       |

The wakeup signal resource configuration lookup table may support UE 115 multiplexing within a one slot wakeup window, where the table indicates a starting symbol index 610 and a number of symbols that each UE 115 or group of UEs 115 may monitor for wakeup signal transmissions. For example, if the base station 105 configures a UE 115 with the configured resources for UE 1 (or UE group 1) as defined in Table 1, the UE 115 may monitor for wakeup signals using a low power receiver during symbol indices 0 and 1 of a TTI or sTTI (e.g., a slot 605, where the slot 605 may correspond to a wakeup signal reception period or pre-wakeup period for wakeup signal detection as described with reference to FIGS. 4 and 5). Similarly, a UE 115 configured for the dedicated wakeup signal occasion defined for UE 2 may monitor for wakeup signals during symbol indices 2, 3, and 4 of the slot 605, a UE 115 configured for the dedicated wakeup signal occasion for UE 3 may monitor during symbol indices 5, 6, and 7, a UE 115 configured for the dedicated wakeup signal occasion for UE 4 may monitor during symbol index 9, and a UE 115 configured for the dedicated wakeup signal occasion for UE 5 may monitor during symbol indices 11 and 12 according to the stored lookup table. In this way, the base station 105 may transmit wakeup signals to any of five different UEs 115 or groups of UEs 115 within a same slot 605, and each UE 115 may detect whether one of the wakeup signals initiates a wakeup procedure for that UE 115. Additionally or alternatively, a UE 115 may be configured with multiple dedicated wakeup signal occasions. For example, a UE 115 may be configured for the dedicated wakeup signal occasions defined for UEs 1 and 3, where the UE 115 may monitor for wakeup transmissions during a first monitoring occasion spanning symbol indices 0 to 1 and a second monitoring occasion spanning symbol indices 5 to 7.

In some cases, a UE 115 may be configured with a time and/or frequency resource configuration parameter for wakeup signal monitoring. For example, a frequency resource configuration parameter may specify a CORESET configuration (e.g., one or more CORESETs for a particular BWP) for the UE 115 to perform wakeup signal detection. Additionally or alternatively, a time resource configuration parameter may specify a search space configuration (e.g., a slot 610 periodicity and an offset in TTIs for one or more search spaces from some reference time) and one or more monitoring occasions within the slot 610. The UE 115 may activate a low power receiver during the times specified by the configuration and monitor for wakeup signals on the frequencies specified by the configuration.

In one example, two UEs 115 or groups of UEs 115 may share the same time and frequency resources for wakeup signal monitoring (e.g., according to a configuration of the wakeup signal resources). In this example, the wakeup signals transmitted by the base station 105 for the different UEs 115 or groups of UEs 115 may use different DCIformats, scrambling sequences, RNTI values, or some combination of these to differentiate the wakeup signals, such that each UE 115 or group of UEs 115 may successfully identify whether a detected wakeup signal was intended for that UE 115 or group of UEs 115. For example, a UE 115 may decode a received wakeup signal using a DCI-format, a scrambling sequence, an RNTI value, or some combination of these configured for that UE 115. If the decoding process is successful, the UE 115 may determine that the received wakeup signal was intended for it, and the UE 115 may initiate a wakeup procedure. If the decoding process is unsuccessful using the configured decoding parameters, the UE 115 may determine that the received wakeup signal was intended for a different UE 115 or group of UEs 115 and may return to a sleep mode.

When a UE 115 detects a wakeup signal transmitted according to the wakeup resource configuration for the UE 115, the UE 115 may initiate a wakeup procedure (e.g., transitioning from a lower power mode to a higher power mode in order to support PDCCH reception and data communication). This higher power mode may correspond to an active duration for the UE 115. The UE 115 may operate according to different configurations pre-wakeup and post-wakeup. For example, the UE 115 may monitor for and receive PDCCH-type wakeup signals according to a first configuration of wakeup signaling resources (e.g., a first search space configuration for monitoring a downlink control channel). However, after the UE 115 wakes up (i.e., during the active duration), the UE 115 may monitor for and receive PDCCH transmissions scheduling the UE 115 for data communication according to a second configuration (e.g., a different PDCCH configuration, such as a second search space configuration for monitoring the downlink control channel). In some cases, this second configuration may correspond to a control channel resource configuration associated with a serving cell configuration (e.g., a Serving-CellConfig) for the UE 115. For example, a UE 115 may be configured to receive PDCCH-type wakeup signals within any symbol indices 610 of a slot 605 based on the configuration for wakeup signal resources 600, while the UE 115 may be limited to receiving PDCCH scheduling within the first three symbols of a slot based on an active mode configuration of the UE 115.

Figure 7:
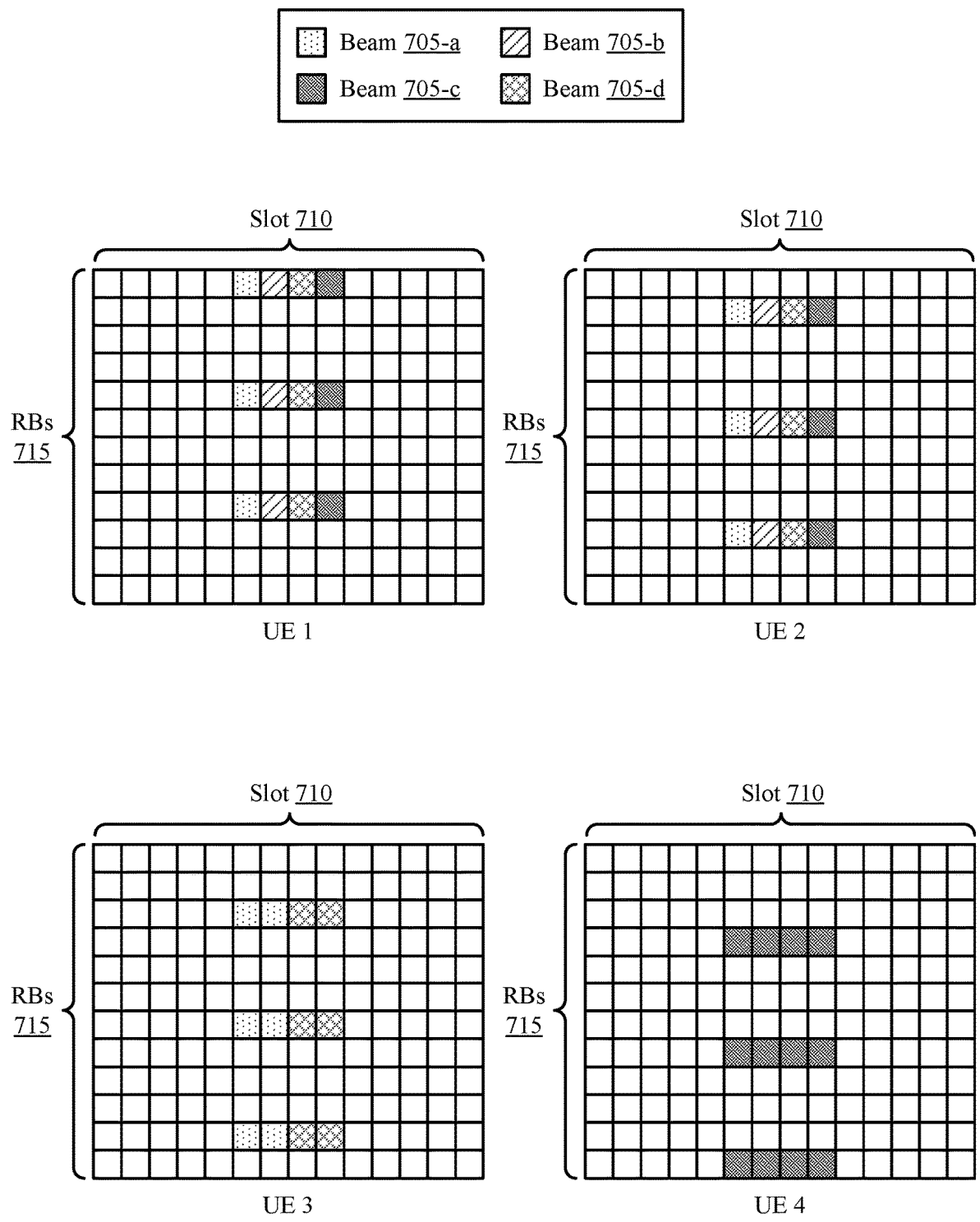

FIG. 7 illustrates a second example of a configuration for wakeup signal resources 700 that supports wakeup signaling resource occasions in accordance with aspects of the present disclosure. The configuration for wakeup signal resources 700 may correspond to a reference signal configuration. A base station 105 may use the configuration for wakeup signal resources 700 for differentiating wakeup signals between UEs 115 or groups of UEs 115. This base station 105 and these UEs 115 may be examples of the corresponding wireless devices described with reference to FIGS. 1 through 6. While the configuration for wakeup signal resources 700, as illustrated, shows one possible wakeup signal resource configuration, many other configurations are possible using any of the techniques described herein.

UEs 115 within a wireless communications system (e.g., an mmW system) may monitor for wakeup signals in one or more wakeup signaling resource occasions according configurations of the UEs 115. For example, a base station 105 may configure a UE 115 with a set of wakeup signal resource configurations. In some cases, the UE 115 may store the set of wakeup signal resource configurations in a lookup table in memory. The base station 105 may then transmit a configuration indicator to the UE 115 that indicates a specific wakeup signal resource configuration for the UE 115 to use for wakeup signal monitoring and reception. In another example, base station 105 may store the set of wakeup signal resource configurations in memory and may transmit an indication of one of the configurations to the UE 115. Each wakeup signal resource configuration may include a set of configuration parameters. These configuration parameters may include time resources, frequency resources, a number of beams for a beam sweep procedure, a number of repetitions per beam for the beam sweep procedure, beam directions, one or more beam patterns, a scrambling sequence, a decoding hypothesis, or any combination of these or other relevant configuration parameters for differentiating reference signal-type wakeup signals.

In some cases, a UE 115 may be configured with a time and/or frequency resource configuration parameter for wakeup signal monitoring. This resource configuration may be an example of a reference signal resource configuration (e.g., similar to a CSI-RS configuration) for receiving reference signal-type wakeup signals. This reference signal resource configuration may apply to monitoring for reference signals for initiating a wakeup procedure, but may not apply to monitoring for reference signals after the UE 115 is awake (i.e., is operating in an active mode). For example, when monitoring for wakeup signals in a low power mode, a UE 115 may monitor according to the configuration for wakeup signal resources 700. When monitoring for references signals (e.g., CSI-RSs, TRSs, DMRSs, etc.) in a high power mode (e.g., during an active duration), the UE 115 may monitor according to a serving cell configuration for the UE 115.

As illustrated, a base station 105 may configure four different UEs 115 or UE 115 groups with different configurations of wakeup signal resources. The base station 105 may multiplex these four UEs 115 or groups of UEs 115 within a same wakeup window spanning a same TTI (e.g., a slot 710) and bandwidth (e.g., resource blocks (RBs) 715). Each of the UEs 115 or groups of UEs 115 may be configured with a different number of beams 705, different repetition factors for the beams 705, different beam patterns, or some combination of these configuration parameters.

For example, a first UE 115 may be configured with four beams 705 (e.g., beams 705-a, 705-b, 705-c, and 705-d), where each beam 705 is not repeated in the beam sweep procedure. These beams 705 may correspond to downlink transmit beams—where the UE 115 attempts to receive a wakeup signal according to the configured downlink transmit beams—or downlink receive beams for the UE 115 to use for wakeup signal reception in the configured time and frequency resources. For example, the first UE 115 may be configured with four beams 705 within a TTI (e.g., the slot 710), where each beam has a repetition factor of 1 (e.g., each beam 705 is used in a single symbol of the TTI). Across time, the set of four beams 705 may be configured with a beam pattern of beam 705-a, then beam 705-b, then beam 705-d, and then beam 705-c. This same beam pattern may be repeated at multiple different frequencies within the set of RBs 715. A second UE 115 may be configured with the same number of beams 705, the same beam repetitions, and the same beam pattern, but in different frequency resources. A third UE 115 may be configured with two beams 705 (e.g., beams 705-a and 705-d), where each of the two beams 705 is repeated once in the beam sweep procedure (e.g., beam 705-a and beam 705-d each have a repetition factor of 2 according to the wakeup signal resource configuration). A fourth UE 115 may be configured with one beam 705-c, where the beam 705-c is repeated such that the wakeup signal is transmitted on that beam 705-*c* across four symbols of the slot 710 (e.g., the beam 705-*c* may be configured with a repetition factor of 4).

In some cases, a UE 115 may determine to initiate a wakeup procedure based on receiving a wakeup signal on any of the configured beams 705 in the configured resources. For example, the UE 115 may be configured with a particular decoding hypothesis for successfully decoding a received wakeup signal according to the wakeup signal resource configuration for the UE 115. This decoding hypothesis may correspond to a beam pattern for receiving the wakeup signal from the base station 105. If the UE 115 receives a wakeup signal according to the configured beam pattern, the UE 115 may successfully decode the wakeup signal using the configured decoding hypothesis and, correspondingly, may initiate a wakeup procedure. It is to be understood that these UE 115 configurations are given as examples, and many other UE 115 configurations for reference signal-type wakeup signal reception are possible using the techniques described herein.

Figure 8:
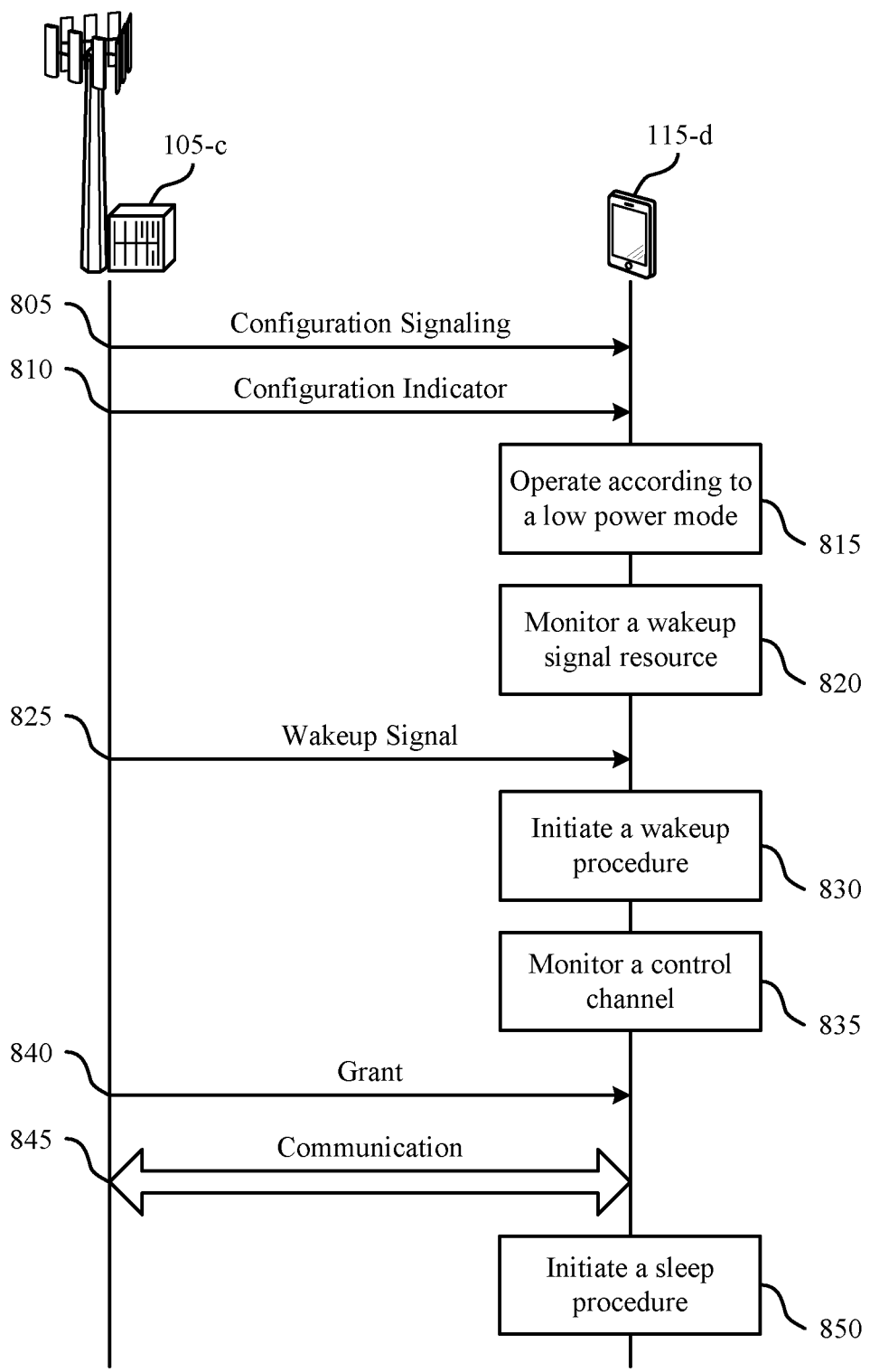
FIG. 8 illustrates an example of a process flow that supports wakeup signaling resource occasions in accordance with aspects of the present disclosure.

FIG. 8 illustrates an example of a process flow 800 that supports wakeup signaling resource occasions in accordance with aspects of the present disclosure. The process flow 800 may include base station 105-*c* and UE 115-*d*, which may be examples of the corresponding devices described with reference to FIGS. 1 through 7. UE 115-*d* may support C-DRX operations using wakeup signals to achieve power savings. UE 115-*d* may be configured (e.g., pre-configured or configured by base station 105-*c*) to receive wakeup signals in specific wakeup signal resources to efficiently utilize the available resources in the system. Alternative examples of the following may be implemented, where some steps are performed in a different order than described or are not performed at all. In some cases, steps may include additional features not mentioned below, or further steps may be added.

At 805, base station 105-*c* may transmit configuration signaling to UE 115-*d*. The configuration signaling may configure UE 115-*d* with a set of wakeup signal resource configurations. Additionally or alternatively, the configuration signaling may configure UE 115-*d* with a monitoring configuration when operating in an active mode. In some cases, the UE 115-*d* may generate a table based on the configuration signaling, and each index in the table may correspond to a respective configuration (e.g., a respective wakeup signal resource configuration). Each wakeup signal resource configuration may include a set of one or more resource parameters. At 810, base station 105-*c* may transmit a configuration indicator to UE 115-*d* indicating a first wakeup signal resource configuration of the set of wakeup signal resource configurations. For example, the UE 115-*d* may index the configured table using the received configuration indicator. UE 115-*d* may determine one or more resource parameters for monitoring for wakeup signals based on the indicated first wakeup signal resource configuration.

In some cases, the first wakeup signal resource configuration may be an example of a downlink control channel resource configuration (e.g., a PDCCH configuration). The first wakeup signal resource configuration may correspond to resource parameters indicating a starting symbol within a TTI, a number of symbols within the TTI, a frequency resource (e.g., a CORESET), a time resource (e.g., a search space), a scrambling sequence, a DCI format, an RNTI value, or some combination of these. In other cases, the first wakeup signal resource configuration may be an example of a reference signal configuration. The first wakeup signal resource configuration may indicate a number of different beams by which a wakeup signal is transmitted, a beam repetition factor for at least one of the beams, a beam pattern for at least one of the beams, a beam pattern for a set of different beams, a decoding hypothesis for decoding the wakeup signal, or some combination of these.

At 815, UE 115-*d* may operate according to a low power mode. For example, the UE 115-*d* may be "asleep," and may not transmit or receive data in this low power mode. UE 115-*d* may periodically monitor for wakeup signals to identify if the UE 115-*d* should wake up for data communication. For example, at 820, UE 115-*d* may monitor a wakeup signal resource for a wakeup signal transmission based on the first wakeup signal resource configuration.

In some cases, base station 105-*c* may not identify any data for communication with UE 115-*d*. Accordingly, base station 105-*c* may not transmit a wakeup signal to UE 115-*d* during the configured wakeup signal monitoring occasion. If UE 115-*d* does not detect a wakeup signal, UE 115-*d* may remain in the low power mode. However, in other cases, base station 105-*c* may identify data for communication with UE 115-*d*. In these cases, base station 105-*c* may transmit a wakeup signal to UE 115-*d* at 825. Base station 105-*d* may transmit the wakeup signal using the wakeup signal resource that UE 115-*d* is configured to monitor. UE 115-*d* may detect the wakeup signal based on the monitoring procedure and may identify that the wakeup signal is intended for UE 115-*d*. Accordingly, UE 115-*d* may initiate a wakeup procedure at 830 based on detecting the wakeup signal. In some examples, the wakeup signal may be an example of an OOK-based tone, a preamble, a reference signal, a PDCCH transmission, or some combination of these signals.

Based on the wakeup procedure, UE 115-*d* may transition from the low power mode to a high power mode (e.g., where "high" and "low" are relative to each other). In the high power mode during an ON duration, UE 115-*d* may monitor a control channel (e.g., the PDCCH) for a scheduling grant at 835. At 840, base station 105-*c* may transmit a scheduling grant to UE 115-*d* on the PDCCH, where the grant schedules UE 115-*d* for data transmission, data reception, or both during an active duration. At 845, UE 115-*d* and base station 105-*c* may communicate according to the scheduling grant.

In some cases, UE 115-*d* may use an inactivity timer to determine when to return to the low power mode. For example, after UE 115-*d* has stopped communicating with base station 105-*c*, UE 115-*d* may initiate the inactivity timer. If the timer expires before UE 115-*d* is scheduled for any further transmissions by base station 105-*c* (e.g., if UE 115-*d* has not received a grant from base station 105-*c* within a defined amount of time), UE 115-*d* may initiate a sleep procedure at 850 and return to the low power mode.

Figure 9:
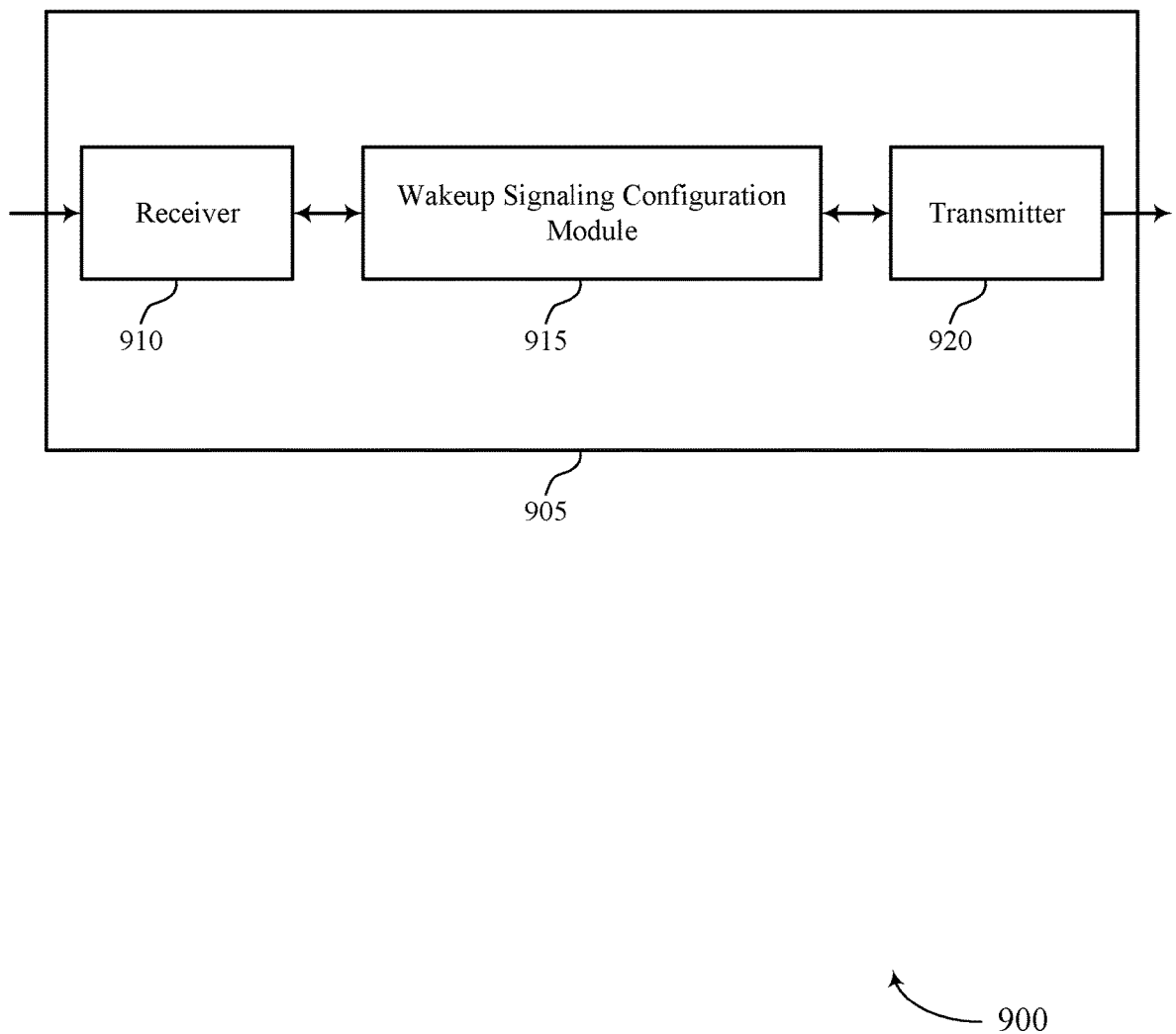
FIGS. 9 and 10 show block diagrams of devices that support wakeup signaling resource occasions in accordance with aspects of the present disclosure.

FIG. 9 shows a block diagram 900 of a device 905 that supports wakeup signaling resource occasions in accordance with aspects of the present disclosure. The device 905 may be an example of aspects of a UE 115 as described herein. The device 905 may include a receiver 910, a wakeup signaling configuration module 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to wakeup signaling resource occasions, etc.). Information may be passed on to other components of the device 905. The receiver 910 may be an example of aspects of the transceiver 1220 described with reference to FIG. 12. The receiver 910 may utilize a single antenna or a set of antennas.

The wakeup signaling configuration module 915 may be a component of a UE 115. The wakeup signaling configuration module 915 may receive configuration signaling configuring the UE 115 with a set of wakeup signal resource configurations, receive a configuration indicator indicating a first wakeup signal resource configuration of the set of wakeup signal resource configurations, and monitor a wakeup signal resource for a wakeup signal transmission based on the first wakeup signal resource configuration. The wakeup signaling configuration module 915 may be an example of aspects of the wakeup signaling configuration module 1210 described herein.

The wakeup signaling configuration module 915, or its sub-components, may be implemented in hardware, code (e.g., software or firmware) executed by a processor, or any combination thereof. If implemented in code executed by a processor, the functions of the wakeup signaling configuration module 915, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The wakeup signaling configuration module 915, or its sub-components, may be physically located at various positions, including being distributed such that portions of functions are implemented at different physical locations by one or more physical components. In some examples, the wakeup signaling configuration module 915, or its sub-components, may be a separate and distinct component in accordance with various aspects of the present disclosure. In some examples, the wakeup signaling configuration module 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
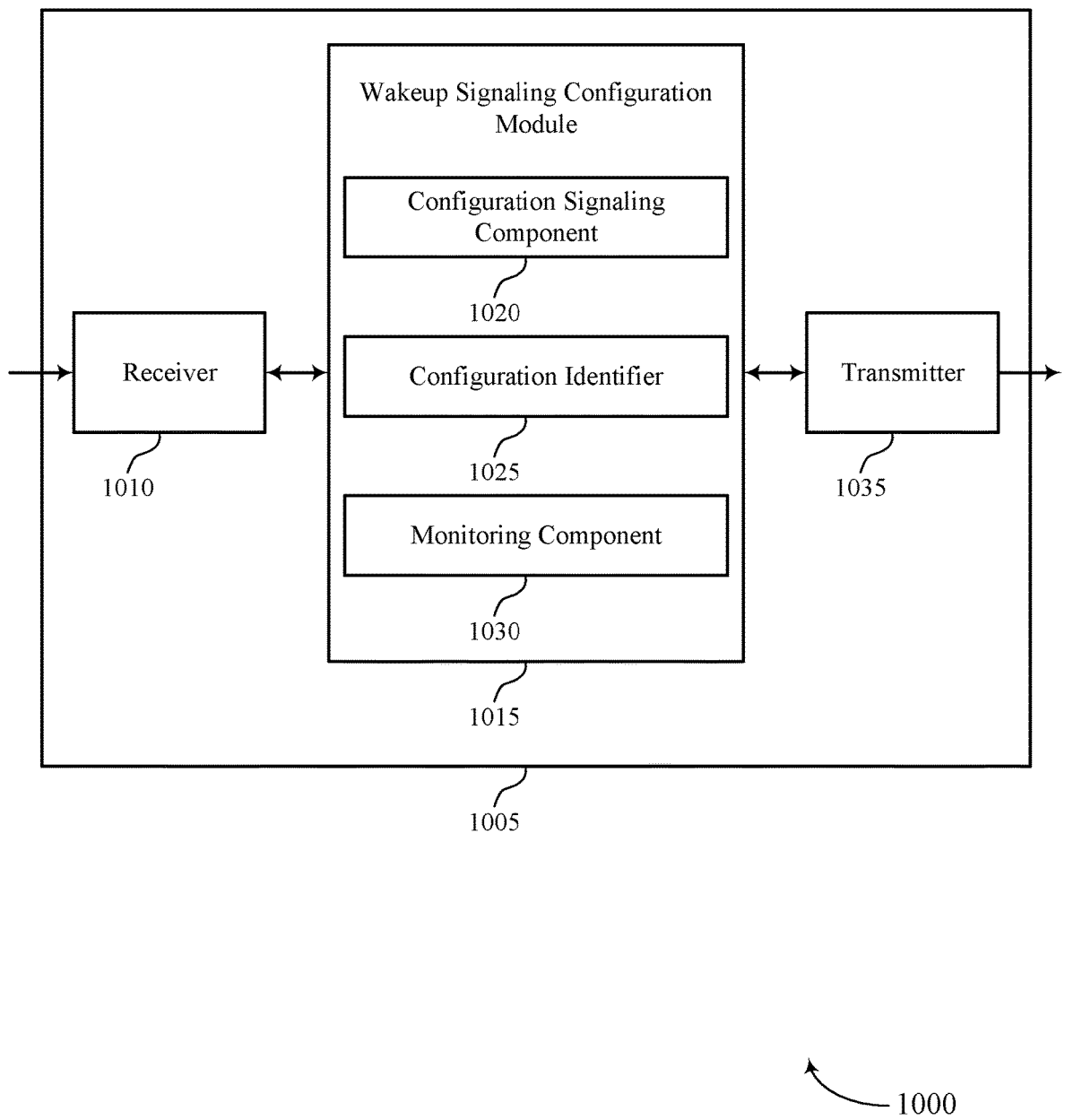

FIG. 10 shows a block diagram 1000 of a device 1005 that supports wakeup signaling resource occasions in accordance with aspects of the present disclosure. The device 1005 may be an example of aspects of a device 905, or a UE 115 as described herein. The device 1005 may include a receiver 1010, a wakeup signaling configuration module 1015, and a transmitter 1035. The device 1005 may also include a processor. Each of these components may be in communication with one another (e.g., via one or more buses).

The receiver 1010 may receive information such as packets, user data, or control information associated with various information channels (e.g., control channels, data channels, and information related to wakeup signaling resource occasions, etc.). Information may be passed on to other components of the device 1005. The receiver 1010 may be an example of aspects of the transceiver 1220 described with reference to FIG. 12. The receiver 1010 may utilize a single antenna or a set of antennas.

The wakeup signaling configuration module 1015 may be an example of aspects of the wakeup signaling configuration module 915 as described herein. The wakeup signaling configuration module 1015 may include a configuration signaling component 1020, a configuration identifier 1025, and a monitoring component 1030. The wakeup signaling configuration module 1015 may be an example of aspects of the wakeup signaling configuration module 1210 described herein.

The configuration signaling component 1020 may be an example of a component of a UE 115. The configuration signaling component 1020 may receive configuration signaling configuring the UE 115 with a set of wakeup signal resource configurations. The configuration identifier 1025 may receive a configuration indicator indicating a first wakeup signal resource configuration of the set of wakeup signal resource configurations. The monitoring component 1030 may monitor a wakeup signal resource for a wakeup signal transmission based on the first wakeup signal resource configuration.

The transmitter 1035 may transmit signals generated by other components of the device 1005. In some examples, the transmitter 1035 may be collocated with a receiver 1010 in a transceiver module. For example, the transmitter 1035 may be an example of aspects of the transceiver 1220 described with reference to FIG. 12. The transmitter 1035 may utilize a single antenna or a set of antennas.

Figure 11:
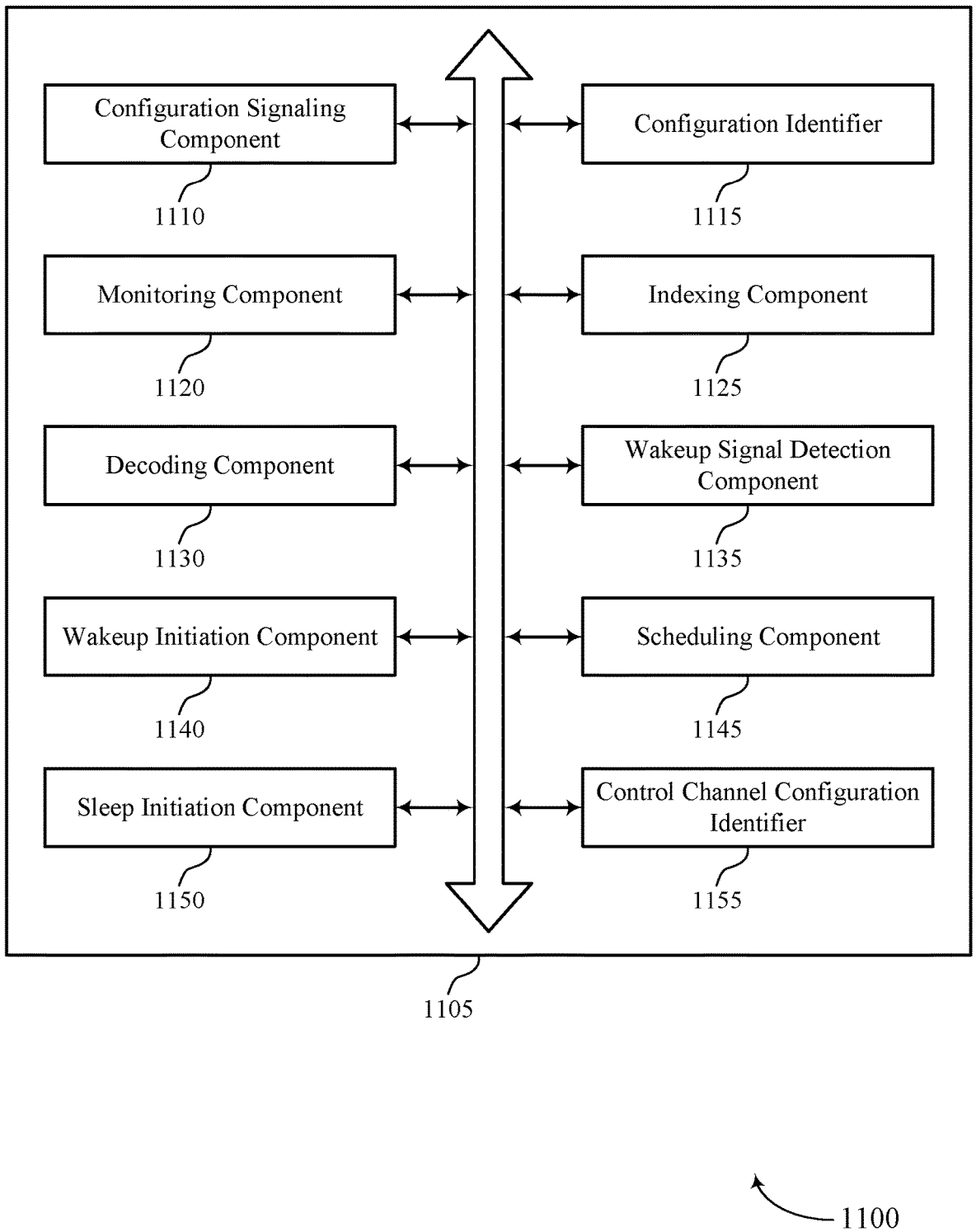
FIG. 11 shows a block diagram of a wakeup signaling configuration module that supports wakeup signaling resource occasions in accordance with aspects of the present disclosure.

FIG. 11 shows a block diagram 1100 of a wakeup signaling configuration module 1105 that supports wakeup signaling resource occasions in accordance with aspects of the present disclosure. The wakeup signaling configuration module 1105 may be an example of aspects of a wakeup signaling configuration module 915, a wakeup signaling configuration module 1015, or a wakeup signaling configuration module 1210 described herein. The wakeup signaling configuration module 1105 may include a configuration signaling component 1110, a configuration identifier 1115, a monitoring component 1120, an indexing component 1125, a decoding component 1130, a wakeup signal detection component 1135, a wakeup initiation component 1140, a scheduling component 1145, a sleep initiation component 1150, and a control channel configuration identifier 1155. Each of these modules may communicate, directly or indirectly, with one another (e.g., via one or more buses).

The configuration signaling component 1110 may receive configuration signaling configuring the UE with a set of wakeup signal resource configurations. The configuration identifier 1115 may receive a configuration indicator indicating a first wakeup signal resource configuration of the set of wakeup signal resource configurations. In some cases, the first wakeup signal resource configuration is a downlink control channel resource configuration. In other cases, the first wakeup signal configuration is a reference signal configuration.

The monitoring component 1120 may monitor a wakeup signal resource for a wakeup signal transmission based on the first wakeup signal resource configuration.

The indexing component 1125 may index a table, based on the configuration indicator, for identifying at least one resource configuration parameter of the first wakeup signal resource configuration, where monitoring the wakeup signal resource further includes the monitoring component 1120 monitoring the wakeup signal resource for the wakeup signal transmission based on the at least one resource configuration parameter.

In some examples, at least one resource configuration parameter indicates a starting symbol within a transmission time interval, and the monitoring component 1120 may monitor the wakeup signal resource for the wakeup signal transmission beginning at the starting symbol within the transmission time interval. In some examples, at least one resource configuration parameter indicates a number of symbols within a transmission time interval, and the monitoring component 1120 may monitor the wakeup signal resource for the wakeup signal transmission beginning within the transmission time interval at the starting symbol and continuing for the number of symbols.

In some examples, at least one resource configuration parameter is a frequency resource configuration parameter, a time resource configuration parameter, or both, and the monitoring component 1120 may monitor the wakeup signal resource for the wakeup signal transmission based on the frequency resource configuration parameter, the time resource configuration parameter, or both. In some cases, the at least one resource configuration parameter is the frequency resource configuration parameter, and the frequency resource configuration parameter is a control resource set configuration parameter. In other cases, the at least one resource configuration parameter is the time resource configuration parameter, where the time resource configuration parameter indicates a search space configuration and a control channel monitoring occasion within a transmission time interval. In some cases, the search space configuration indicates a transmission time interval periodicity and an offset indicating a number of transmission time intervals relative to a reference time.

In some examples, the first wakeup signal resource configuration indicates a number of different beams by which a wakeup signal is transmitted within a transmission time interval, and the monitoring component 1120 may monitor the wakeup signal resource for the wakeup signal transmission within the transmission time interval based on the number of different beams.

In some examples, the first wakeup signal resource configuration indicates a beam repetition factor for at least one beam by which a wakeup signal is transmitted within a transmission time interval, and the monitoring component 1120 may monitor the wakeup signal resource for the wakeup signal transmission within the transmission time interval based on the beam repetition factor.

In some examples, the first wakeup signal resource configuration indicates a beam pattern for at least one beam by which a wakeup signal is transmitted within a transmission time interval, and the monitoring component 1120 may monitor the wakeup signal resource for the wakeup signal transmission within the transmission time interval based on the beam pattern. Additionally or alternatively, the first wakeup signal resource configuration indicates a beam pattern for a set of different beams by which a wakeup signal is transmitted within a transmission time interval, and the monitoring component 1120 may monitor the wakeup signal resource for the wakeup signal transmission within the transmission time interval based on the beam pattern.

In some examples, the monitoring component 1120 may monitor a downlink control channel for the wakeup signal transmission.

In some examples, at least one resource configuration parameter indicates a scrambling sequence, and the decoding component 1130 may decode the first wakeup signal resource based on the scrambling sequence. In some examples, at least one resource configuration parameter indicates a DCI format, and the decoding component 1130 may decode the first wakeup signal resource based on the DCI format. In some examples, at least one resource configuration parameter indicates an RNTI, and the decoding component 1130 may decode the first wakeup signal resource based on the RNTI.

In some examples, each wakeup signal resource configuration of the set of wakeup signal resource configurations corresponds to a different decoding hypothesis of a set of decoding hypotheses, and the decoding component 1130 may identify a first decoding hypothesis of the set of decoding hypotheses based on the first wakeup signal configuration and may monitor the wakeup signal resource for the wakeup signal transmission based on the first decoding hypothesis. In some cases, each decoding hypothesis of the set of decoding hypotheses corresponds to a different beam pattern for at least one beam by which a wakeup signal is transmitted within a transmission time interval.

The wakeup signal detection component 1135 may detect a wakeup signal for the UE within the wakeup signal resource. The wakeup initiation component 1140 may initiate a wakeup procedure based on detecting the wakeup signal and may monitor a control channel subsequent to initiating the wakeup procedure.

The scheduling component 1145 may detect, within the control channel, a grant from a serving base station. In some examples, the scheduling component 1145 may communicate based on the grant. The sleep initiation component 1150 may initiate a sleep procedure based on determining that a grant has not been received within a defined amount of time.

The control channel configuration identifier 1155 may identify a control channel resource configuration of a serving base station. In some examples, the control channel configuration identifier 1155 may monitor the control channel based on the control channel resource configuration. In some cases, the control channel resource configuration differs from the first wakeup signal resource configuration.

A UE may implement the wakeup signaling configuration module 1105. In some cases, the configuration signaling component 1110 may receive a first search space configuration for monitoring a downlink control channel while operating in a low power mode and may receive a second search space configuration for monitoring the downlink control channel while operating in an active mode, where the second search space configuration is different from the first search space configuration. The monitoring component 1120 may monitor the downlink control channel according to the first search space configuration for a wakeup signal transmission based on the UE operating in the low power mode.

In some cases, the first search space configuration includes at least one resource configuration parameter and the monitoring the downlink control channel is based on the at least one resource configuration parameter. For example, the at least one resource configuration parameter may be a starting symbol within a TTI, a number of symbols within the TTI, a frequency resource configuration parameter (e.g., a CORESET configuration parameter), a time resource configuration parameter (e.g., a search space configuration parameter or control channel monitoring occasion configuration parameter), a scrambling sequence, a DCI format, an RNTI, or a combination thereof, and monitoring the downlink control channel, decoding the wakeup signal transmission, or both may be based on any number of these parameters. In some examples, the first search space configuration may include multiple CORESETs in a BWP, multiple control channel monitoring occasions within a TTI or search space, or both.

The wakeup signal detection component 1135 may detect a wakeup signal for the UE based on monitoring the downlink control channel according to the first search space configuration. The wakeup initiation component 1140 may initiate a wakeup procedure based on detecting the wakeup signal. The monitoring component 1120 may monitor the downlink control channel subsequent to initiating the wakeup procedure according to the second search space configuration based on the UE operating in the active mode. In some cases, the decoding component 1130 may detect a grant from a serving base station based on monitoring the downlink control channel according to the second search space configuration and the scheduling component 1145 may communicate with the serving base station based on the grant. In some other cases, the sleep initiation component 1150 may initiate a sleep procedure based on determining that a grant has not been received within a defined amount of time from monitoring the downlink control channel according to the second search space configuration and the monitoring component 1120 may monitor the downlink control channel subsequent to initiating the sleep procedure according to the first search space configuration based on the UE operating in the low power mode. The UE may monitor the downlink control channel according to the first search space configuration using a low power receiver based on the UE operating in the low power mode and may monitor the downlink control channel according to the second search space configuration using a standard receiver different from the low power receiver based on the UE operating in the active mode.

Figure 12:
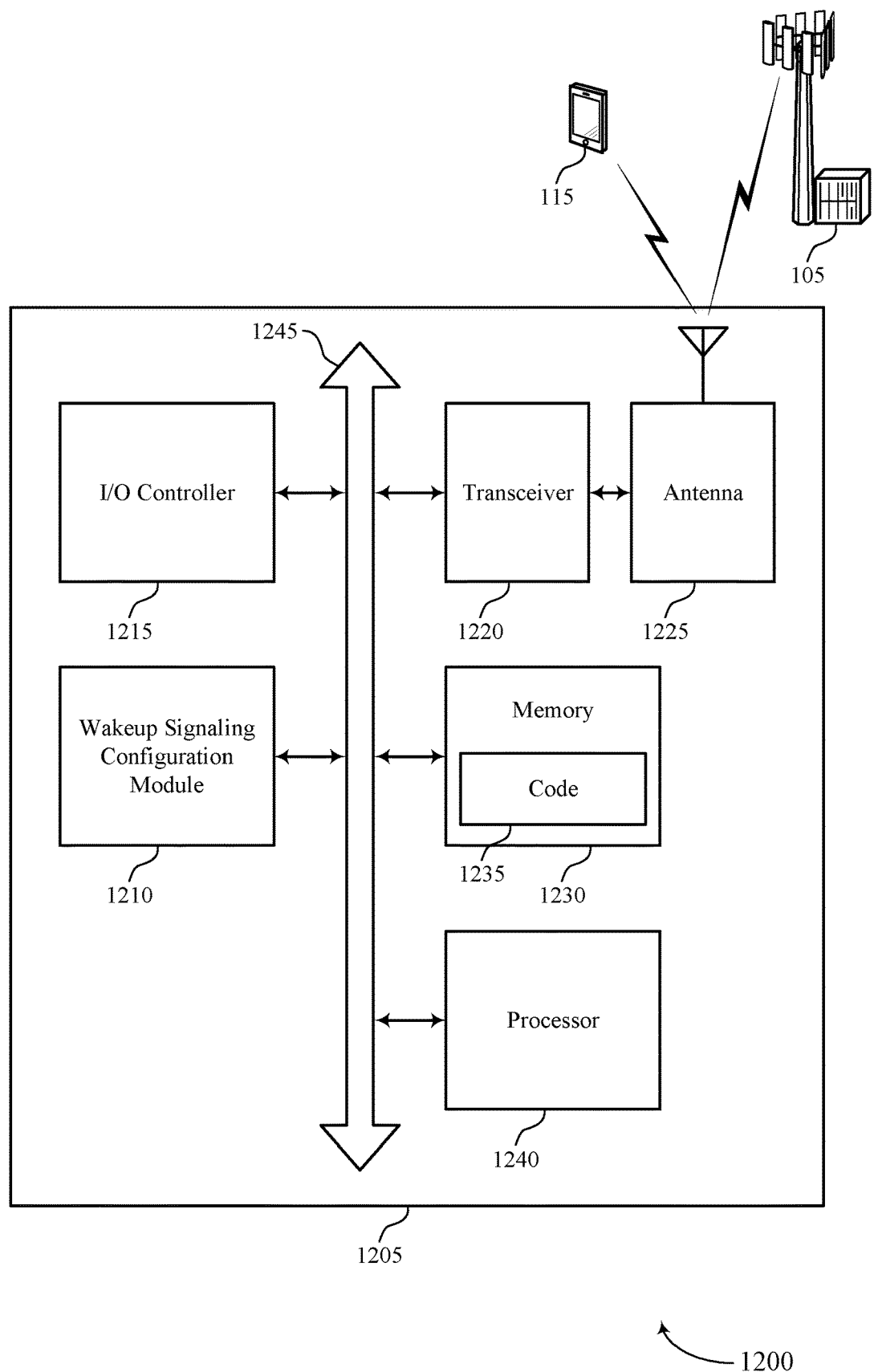
FIG. 12 shows a diagram of a system including a device that supports wakeup signaling resource occasions in accordance with aspects of the present disclosure.

FIG. 12 shows a diagram of a system 1200 including a device 1205 that supports wakeup signaling resource occasions in accordance with aspects of the present disclosure. The device 1205 may be an example of or include the components of device 905, device 1005, or a UE 115 as described herein. The device 1205 may include components for bi-directional voice and data communications including components for transmitting and receiving communications, including a wakeup signaling configuration module 1210, an I/O controller 1215, a transceiver 1220, an antenna 1225, memory 1230, and a processor 1240. These components may be in electronic communication via one or more buses (e.g., bus 1245).

The wakeup signaling configuration module 1210 may receive configuration signaling configuring the device 1205 (e.g., a UE 115) with a set of wakeup signal resource configurations, receive a configuration indicator indicating a first wakeup signal resource configuration of the set of wakeup signal resource configurations, and monitor a wakeup signal resource for a wakeup signal transmission based on the first wakeup signal resource configuration.

The I/O controller 1215 may manage input and output signals for the device 1205. The I/O controller 1215 may also manage peripherals not integrated into the device 1205. In some cases, the I/O controller 1215 may represent a physical connection or port to an external peripheral. In some cases, the I/O controller 1215 may utilize an operating system such as iOS®, ANDROID®, MS-DOS®, MS-WINDOWS®, OS/2®, UNIX®, LINUX®, or another known operating system. In other cases, the I/O controller 1215 may represent or interact with a modem, a keyboard, a mouse, a touchscreen, or a similar device. In some cases, the I/O controller 1215 may be implemented as part of a processor. In some cases, a user may interact with the device 1205 via the I/O controller 1215 or via hardware components controlled by the I/O controller 1215.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include random-access memory (RAM) and read-only memory (ROM). The memory 1230 may store computer-readable, computer-executable code 1235 including instructions that, when executed, cause the processor to perform various functions described herein. In some cases, the memory 1230 may contain, among other things, a basic I/O system (BIOS) which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting wakeup signaling resource occasions).

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
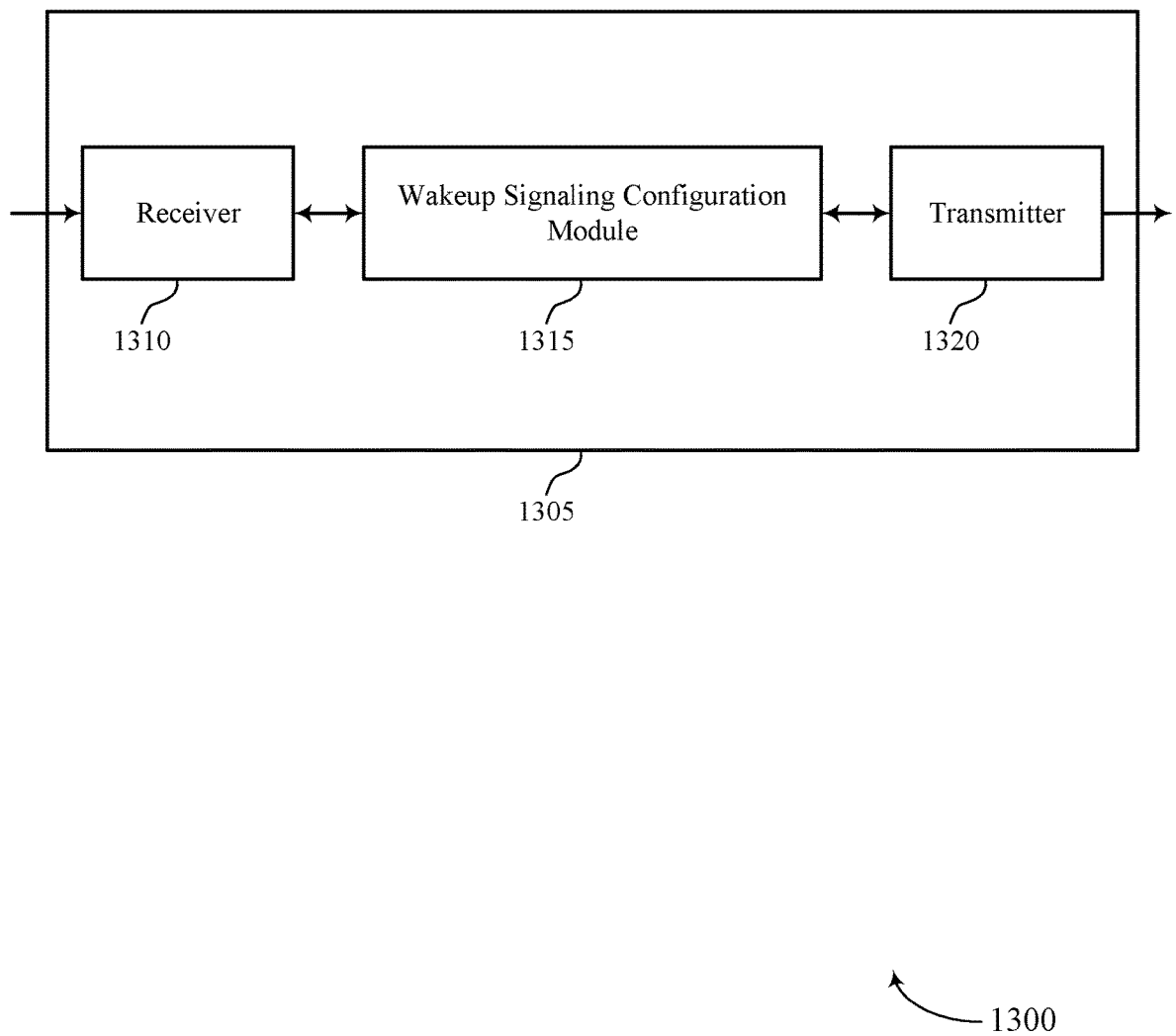
FIGS. 13 and 14 show block diagrams of devices that support wakeup signaling resource occasions in accordance with aspects of the present disclosure.

FIG. 13 shows a block diagram 1300 of a device 1305 that supports wakeup signaling resource occasions in accordance with aspects of the present disclosure. The device 1305 may be an example of aspects of a base station 105 as described herein. The device 1305 may include a receiver 1310, a wakeup signaling configuration module 1315, and a transmitter 1320. The device 1305 may also include a processor. Each of these components may be in communication with one another (e.g., via one or more buses).

The receiver 1310 may receive information such as packets, user data, or control information associated with various information channels (e.g., control channels, data channels, and information related to wakeup signaling resource occasions, etc.). Information may be passed on to other components of the device 1305. The receiver 1310 may be an example of aspects of the transceiver 1620 described with reference to FIG. 16. The receiver 1310 may utilize a single antenna or a set of antennas.

The wakeup signaling configuration module 1315 may be a component of a base station 105. The wakeup signaling configuration module 1315 may transmit configuration signaling configuring a UE 115 with a set of wakeup signal resource configurations, transmit a configuration indicator indicating a first wakeup signal resource configuration of the set of wakeup signal resource configurations, and transmit a wakeup signal transmission using a wakeup signal resource based on the first wakeup signal resource configuration. The wakeup signaling configuration module 1315 may be an example of aspects of the wakeup signaling configuration module 1610 described herein.

The wakeup signaling configuration module 1315, or its sub-components, may be implemented in hardware, code (e.g., software or firmware) executed by a processor, or any combination thereof. If implemented in code executed by a processor, the functions of the wakeup signaling configuration module 1315, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The wakeup signaling configuration module 1315, or its sub-components, may be physically located at various positions, including being distributed such that portions of functions are implemented at different physical locations by one or more physical components. In some examples, the wakeup signaling configuration module 1315, or its sub-components, may be a separate and distinct component in accordance with various aspects of the present disclosure. In some examples, the wakeup signaling configuration module 1315, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1320 may transmit signals generated by other components of the device 1305. In some examples, the transmitter 1320 may be collocated with a receiver 1310 in a transceiver module. For example, the transmitter 1320 may be an example of aspects of the transceiver 1620 described with reference to FIG. 16. The transmitter 1320 may utilize a single antenna or a set of antennas.

Figure 14:
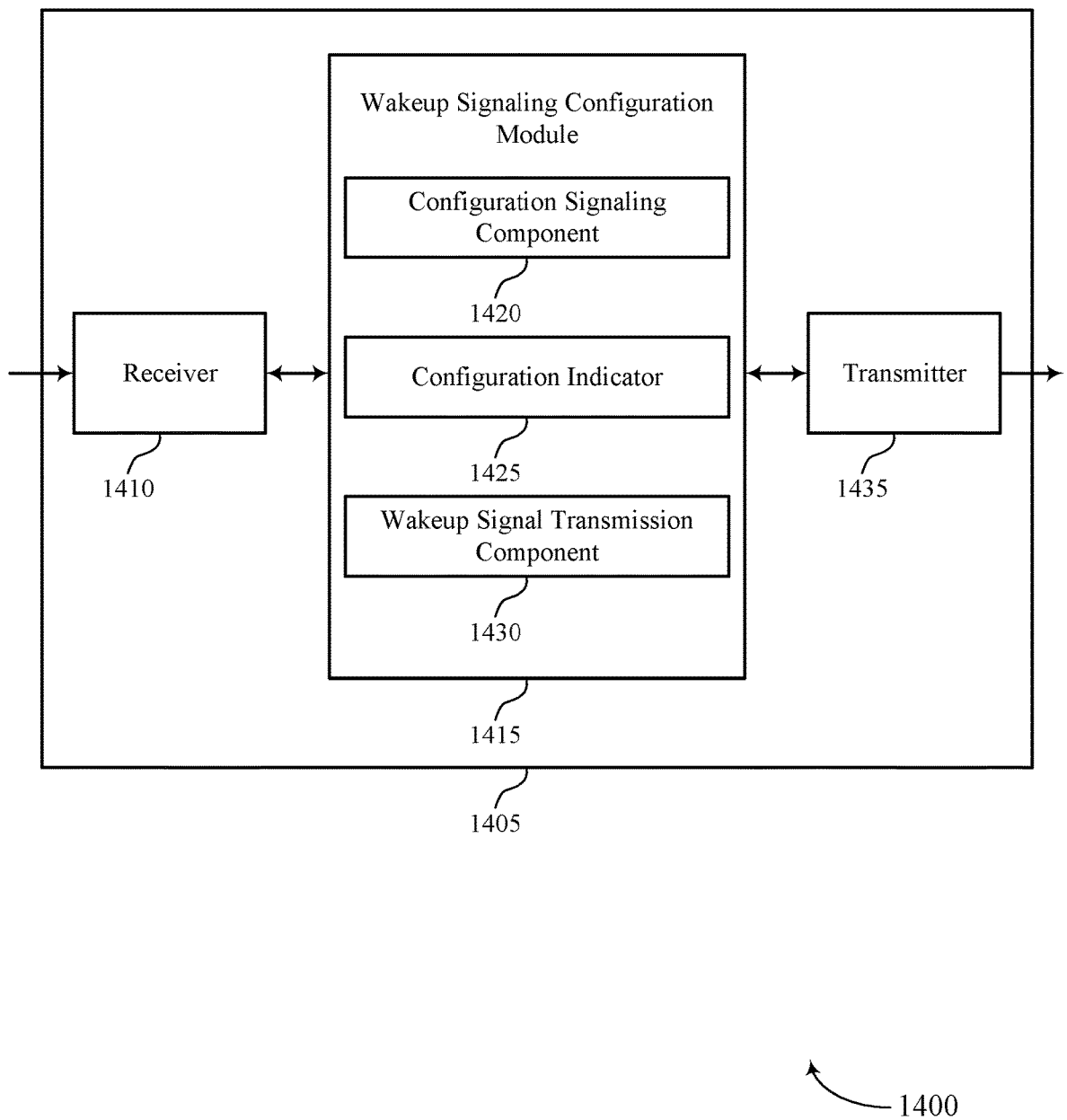

FIG. 14 shows a block diagram 1400 of a device 1405 that supports wakeup signaling resource occasions in accordance with aspects of the present disclosure. The device 1405 may be an example of aspects of a device 1305, or a base station 105 as described herein. The device 1405 may include a receiver 1410, a wakeup signaling configuration module 1415, and a transmitter 1435. The device 1405 may also include a processor. Each of these components may be in communication with one another (e.g., via one or more buses).

The receiver 1410 may receive information such as packets, user data, or control information associated with various information channels (e.g., control channels, data channels, and information related to wakeup signaling resource occasions, etc.). Information may be passed on to other components of the device 1405. The receiver 1410 may be an example of aspects of the transceiver 1620 described with reference to FIG. 16. The receiver 1410 may utilize a single antenna or a set of antennas.

The wakeup signaling configuration module 1415 may be an example of aspects of the wakeup signaling configuration module 1315 as described herein. The wakeup signaling configuration module 1415 may include a configuration signaling component 1420, a configuration indicator 1425, and a wakeup signal transmission component 1430. The wakeup signaling configuration module 1415 may be an example of aspects of the wakeup signaling configuration module 1610 described herein.

The configuration signaling component 1420 may transmit configuration signaling configuring a UE 115 with a set of wakeup signal resource configurations. The configuration indicator 1425 may transmit a configuration indicator indicating a first wakeup signal resource configuration of the set of wakeup signal resource configurations. The wakeup signal transmission component 1430 may transmit a wakeup signal transmission using a wakeup signal resource based on the first wakeup signal resource configuration.

The transmitter 1435 may transmit signals generated by other components of the device 1405. In some examples, the transmitter 1435 may be collocated with a receiver 1410 in a transceiver module. For example, the transmitter 1435 may be an example of aspects of the transceiver 1620 described with reference to FIG. 16. The transmitter 1435 may utilize a single antenna or a set of antennas.

Figure 15:
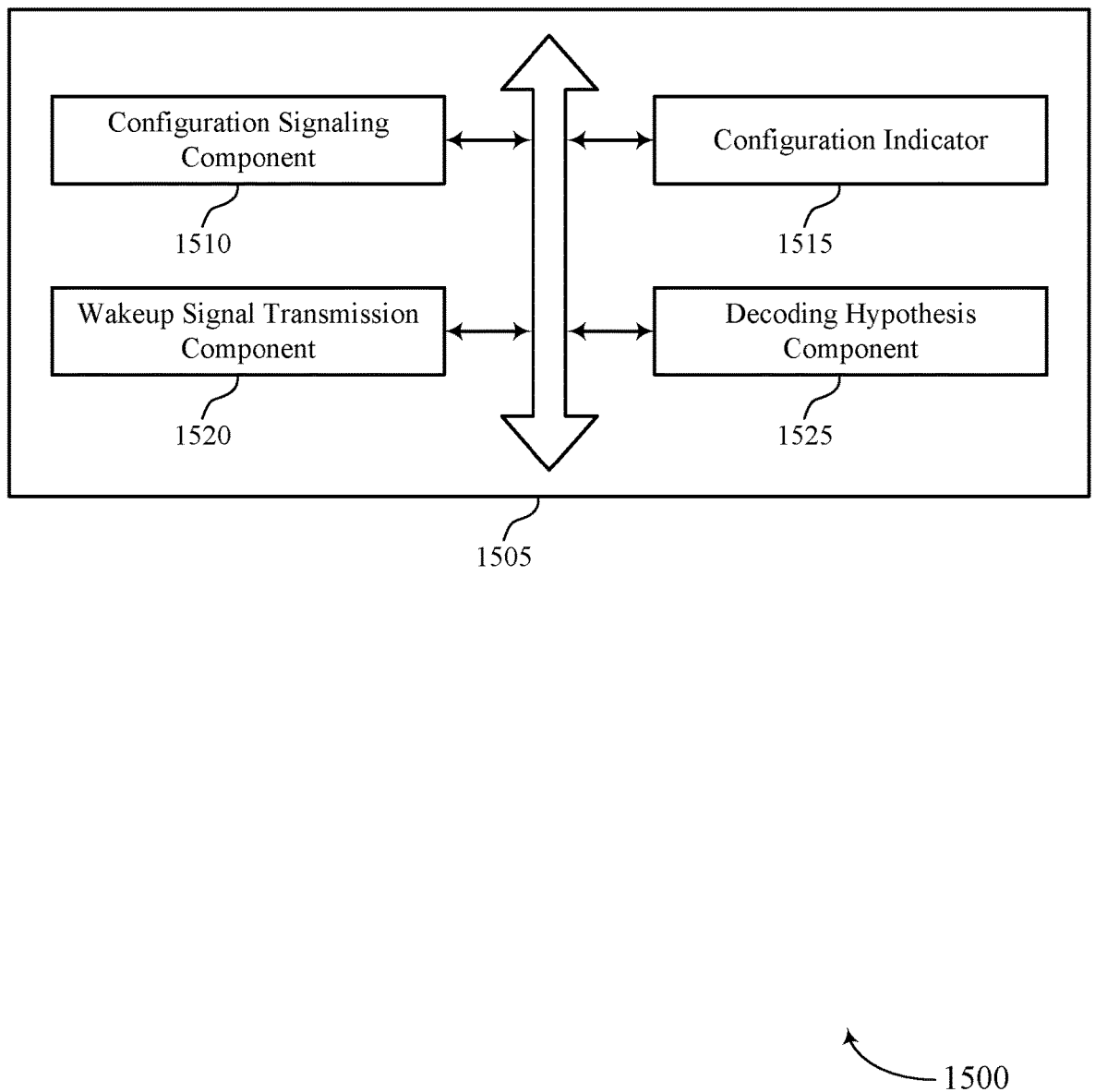
FIG. 15 shows a block diagram of a wakeup signaling configuration module that supports wakeup signaling resource occasions in accordance with aspects of the present disclosure.

FIG. 15 shows a block diagram 1500 of a wakeup signaling configuration module 1505 that supports wakeup signaling resource occasions in accordance with aspects of the present disclosure. The wakeup signaling configuration module 1505 may be an example of aspects of a wakeup signaling configuration module 1315, a wakeup signaling configuration module 1415, or a wakeup signaling configuration module 1610 described herein. The wakeup signaling configuration module 1505 may include a configuration signaling component 1510, a configuration indicator 1515, a wakeup signal transmission component 1520, and a decoding hypothesis component 1525. Each of these modules may communicate, directly or indirectly, with one another (e.g., via one or more buses).

The configuration signaling component 1510 may transmit configuration signaling configuring a UE 115 with a set of wakeup signal resource configurations. In some cases, the configuration signaling indicates a configuration of a table that includes at least one resource configuration parameter for each wakeup signal resource configuration of the set of wakeup signal resource configurations.

The configuration indicator 1515 may transmit a configuration indicator indicating a first wakeup signal resource configuration of the set of wakeup signal resource configurations. In some cases, the first wakeup signal resource configuration indicates a DCI format, a scrambling sequence, an RNTI, or any combination thereof. In some cases, the first wakeup signal resource is a downlink control channel. In some cases, the first wakeup signal resource configuration is a reference signal resource configuration. In other cases, the first wakeup signal resource configuration is a downlink control channel resource configuration.

The wakeup signal transmission component 1520 may transmit a wakeup signal transmission using a wakeup signal resource based on the first wakeup signal resource configuration.

In some examples, the first wakeup signal resource configuration indicates a starting symbol within a transmission time interval, and the wakeup signal transmission component 1520 may transmit the wakeup signal transmission using the wakeup signal resource beginning at the starting symbol within the transmission time interval. In some examples, the first wakeup signal resource configuration indicates a number of symbols within the transmission time interval, and the wakeup signal transmission component 1520 may transmit the wakeup signal transmission using the wakeup signal resource beginning within the transmission time interval at the starting symbol and continuing for the number of symbols.

In some examples, the first wakeup signal resource configuration indicates a frequency resource configuration parameter, a time resource configuration parameter, or both, and the wakeup signal transmission component 1520 may transmit the wakeup signal transmission using the wakeup signal resource based on the frequency resource configuration parameter, the time resource configuration parameter, or both.

In some examples, the first wakeup signal resource configuration indicates a number of different beams by which a wakeup signal is transmitted within a transmission time interval, and the wakeup signal transmission component 1520 may transmit the wakeup signal transmission using the wakeup signal resource within the transmission time interval based on the number of different beams. Additionally or alternatively, the first wakeup signal resource configuration may indicate a beam repetition factor for at least one beam by which a wakeup signal is transmitted within a transmission time interval, and the wakeup signal transmission component 1520 may transmit the wakeup signal transmission using the wakeup signal resource within the transmission time interval based on the beam repetition factor.

In some examples, the first wakeup signal resource configuration indicates a beam pattern for at least one beam by which a wakeup signal is transmitted within a transmission time interval, and the wakeup signal transmission component 1520 may transmit the wakeup signal transmission using the wakeup signal resource within the transmission time interval based on the beam pattern. Additionally or alternatively, the first wakeup signal resource configuration may indicate a beam pattern for a set of different beams by which a wakeup signal is transmitted within a transmission time interval, and the wakeup signal transmission component 1520 may transmit the wakeup signal transmission using the wakeup signal resource within the transmission time interval based on the beam pattern.

In some cases, the decoding hypothesis component 1525 may support each wakeup signal resource configuration of the set of wakeup signal resource configurations corresponding to a different decoding hypothesis of a set of decoding hypotheses. In some cases, each decoding hypothesis of the set of decoding hypotheses corresponds to a different beam pattern for at least one beam by which a wakeup signal is transmitted within a transmission time interval.

A base station 105 may implement the wakeup signaling configuration module 1505. In some cases, the configuration signaling component 1510 may configure a UE with a first search space configuration for monitoring a downlink control channel while operating in a low power mode and may configure the UE with a second search space configuration for monitoring the downlink control channel while operating in an active mode, where the second search space configuration is different from the first search space configuration. In some examples, the configuration signaling component 1510 may transmit, to the UE, configuration signaling configuring the UE with the first search space configuration, the second search space configuration, or both. The wakeup signal transmission component 1520 may transmit, to the UE, a wakeup signal transmission using a wakeup signal resource according to the first search space configuration based on the UE operating in the low power mode.

Figure 16:
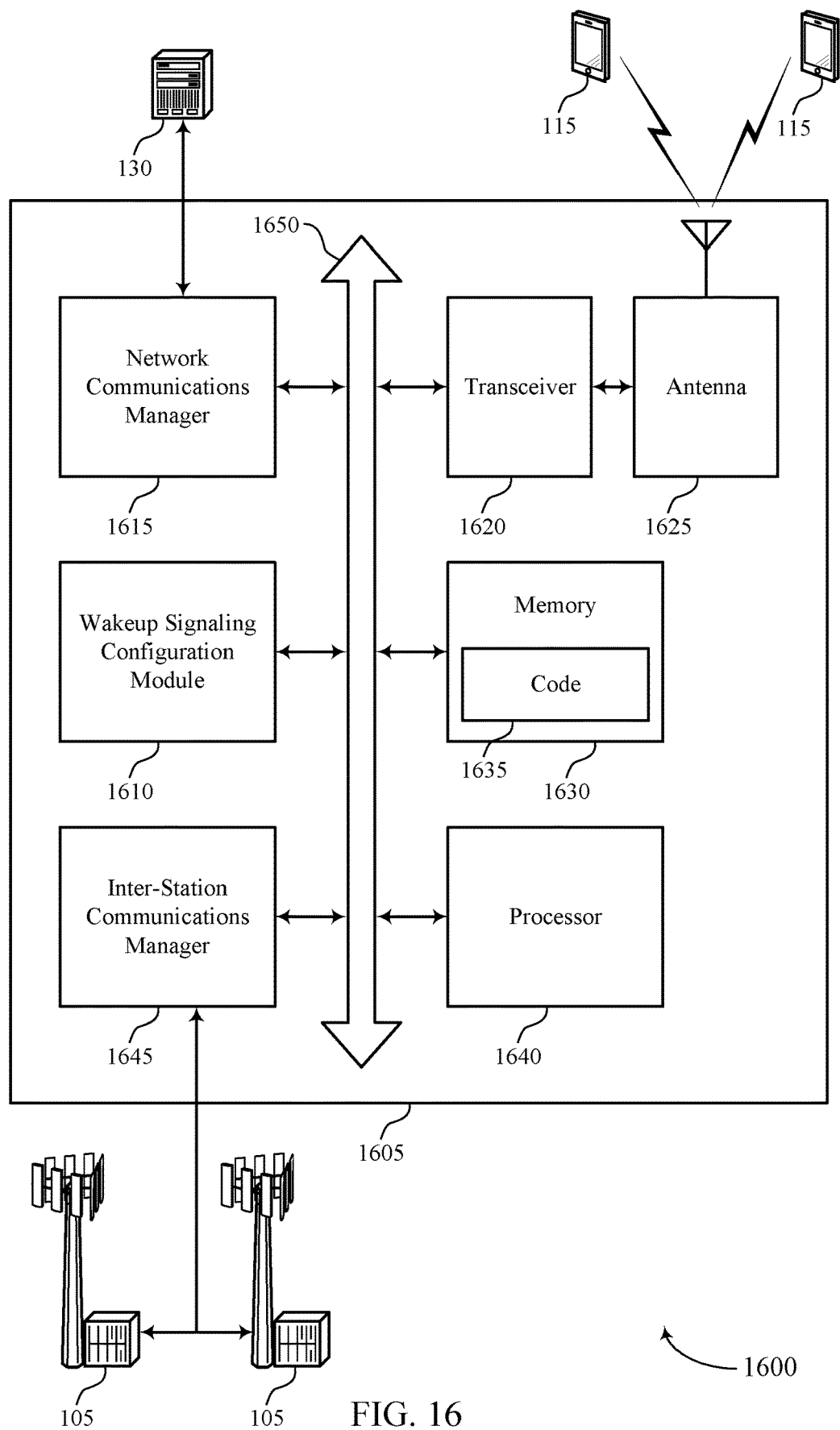
FIG. 16 shows a diagram of a system including a device that supports wakeup signaling resource occasions in accordance with aspects of the present disclosure.

FIG. 16 shows a diagram of a system 1600 including a device 1605 that supports wakeup signaling resource occasions in accordance with aspects of the present disclosure.

The device 1605 may be an example of or include the components of device 1305, device 1405, or a base station 105 as described herein. The device 1605 may include components for bi-directional voice and data communications including components for transmitting and receiving communications, including a wakeup signaling configuration module 1610, a network communications manager 1615, a transceiver 1620, an antenna 1625, memory 1630, a processor 1640, and an inter-station communications manager 1645. These components may be in electronic communication via one or more buses (e.g., bus 1650).

The wakeup signaling configuration module 1610 may transmit configuration signaling configuring a UE 115 with a set of wakeup signal resource configurations, transmit a configuration indicator indicating a first wakeup signal resource configuration of the set of wakeup signal resource configurations, and transmit a wakeup signal transmission using a wakeup signal resource based on the first wakeup signal resource configuration.

The network communications manager 1615 may manage communications with the core network 130 (e.g., via one or more wired backhaul links). For example, the network communications manager 1615 may manage the transfer of data communications for client devices, such as one or more UEs 115.

The transceiver 1620 may communicate bi-directionally, via one or more antennas, wired, or wireless links as described above. For example, the transceiver 1620 may represent a wireless transceiver and may communicate bi-directionally with another wireless transceiver. The transceiver 1620 may also include a modem to modulate the packets and provide the modulated packets to the antennas for transmission, and to demodulate packets received from the antennas.

In some cases, the wireless device may include a single antenna 1625. However, in some cases the device may have more than one antenna 1625, which may be capable of concurrently transmitting or receiving multiple wireless transmissions.

The memory 1630 may include RAM, ROM, or a combination thereof. The memory 1630 may store computer-readable code 1635 including instructions that, when executed by a processor (e.g., the processor 1640) cause the device to perform various functions described herein. In some cases, the memory 1630 may contain, among other things, a BIOS which may control basic hardware or software operation such as the interaction with peripheral components or devices.

The processor 1640 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1640 may be configured to operate a memory array using a memory controller. In some cases, a memory controller may be integrated into processor 1640. The processor 1640 may be configured to execute computer-readable instructions stored in a memory (e.g., the memory 1630) to cause the device 1605 to perform various functions (e.g., functions or tasks supporting wakeup signaling resource occasions).

The inter-station communications manager 1645 may manage communications with other base station 105 and may include a controller or scheduler for controlling communications with UEs 115 in cooperation with other base stations 105. For example, the inter-station communications manager 1645 may coordinate scheduling for transmissions to UEs 115 for various interference mitigation techniques such as beamforming or joint transmission. In some examples, the inter-station communications manager 1645 may provide an X2 interface within an LTE/LTE-A wireless communication network technology to provide communication between base stations 105.

The code 1635 may include instructions to implement aspects of the present disclosure, including instructions to support wireless communications. The code 1635 may be stored in a non-transitory computer-readable medium such as system memory or other type of memory. In some cases, the code 1635 may not be directly executable by the processor 1640 but may cause a computer (e.g., when compiled and executed) to perform functions described herein.

Figure 17:
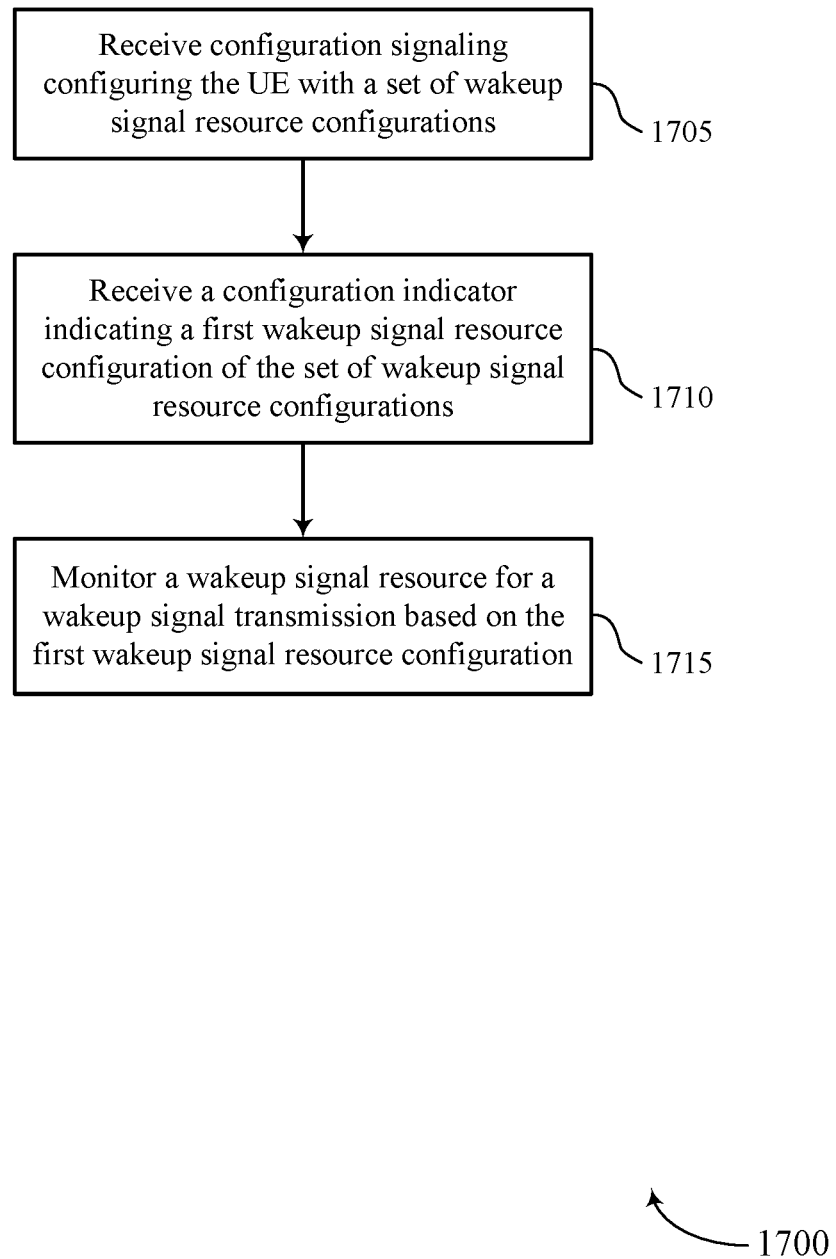
FIGS. 17 through 19 show flowcharts illustrating methods that support wakeup signaling resource occasions in accordance with aspects of the present disclosure.

FIG. 17 shows a flowchart illustrating a method 1700 that supports wakeup signaling resource occasions in accordance with aspects of the present disclosure. The operations of method 1700 may be implemented by a UE 115 or its components as described herein. For example, the operations of method 1700 may be performed by a wakeup signaling configuration module as described with reference to FIGS. 9 through 12. In some examples, a UE may execute a set of instructions to control the functional elements of the UE to perform the functions described below. Additionally or alternatively, a UE may perform aspects of the functions described below using special-purpose hardware.

At 1705, the UE may receive configuration signaling configuring the UE with a set of wakeup signal resource configurations. The operations of 1705 may be performed according to the methods described herein. In some examples, aspects of the operations of 1705 may be performed by a configuration signaling component as described with reference to FIGS. 9 through 12.

At 1710, the UE may receive a configuration indicator indicating a first wakeup signal resource configuration of the set of wakeup signal resource configurations. The operations of 1710 may be performed according to the methods described herein. In some examples, aspects of the operations of 1710 may be performed by a configuration identifier as described with reference to FIGS. 9 through 12.

At 1715, the UE may monitor a wakeup signal resource for a wakeup signal transmission based on the first wakeup signal resource configuration. The operations of 1715 may be performed according to the methods described herein. In some examples, aspects of the operations of 1715 may be performed by a monitoring component as described with reference to FIGS. 9 through 12.

Figure 18:
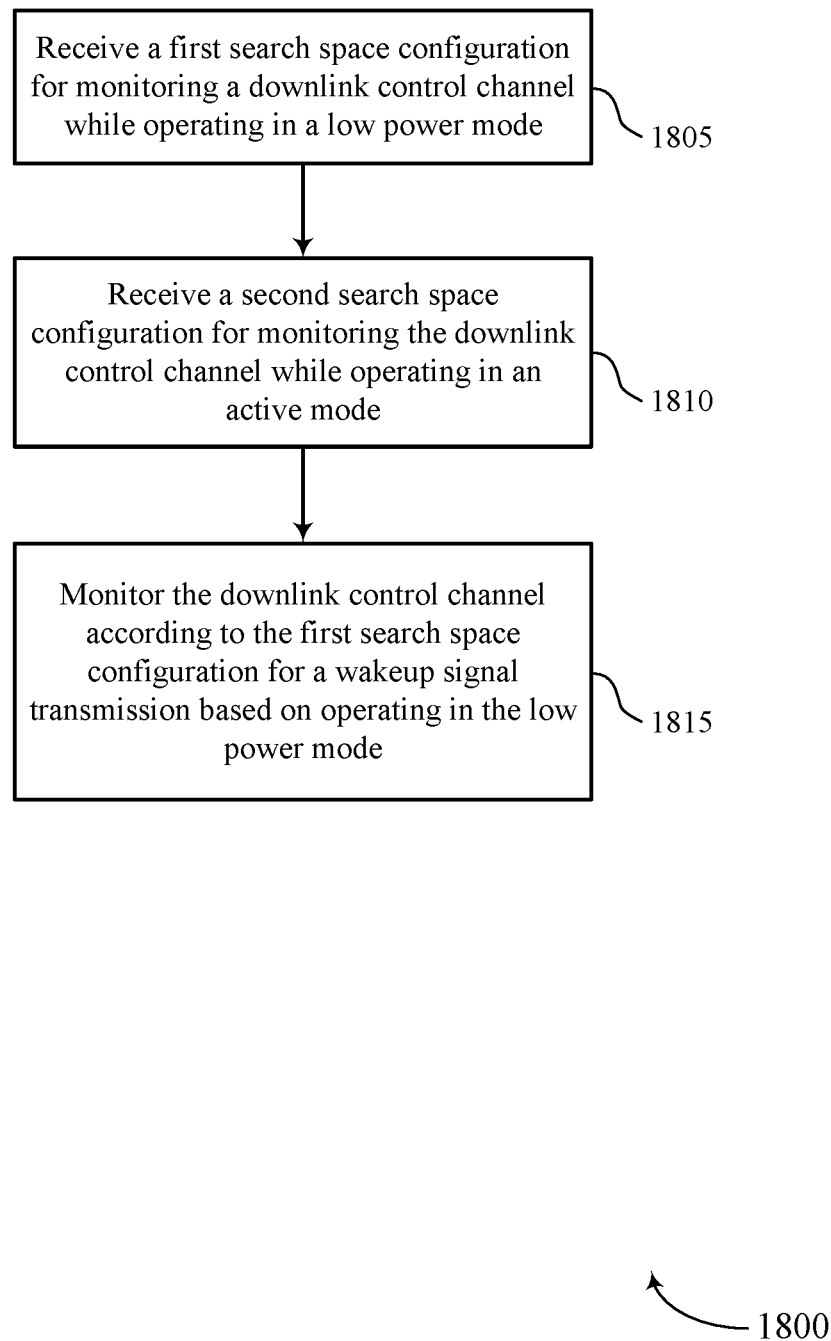

FIG. 18 shows a flowchart illustrating a method 1800 that supports wakeup signaling resource occasions in accordance with aspects of the present disclosure. The operations of method 1800 may be implemented by a UE 115 or its components as described herein. For example, the operations of method 1800 may be performed by a wakeup signaling configuration module as described with reference to FIGS. 9 through 12. In some examples, a UE may execute a set of instructions to control the functional elements of the UE to perform the functions described below. Additionally or alternatively, a UE may perform aspects of the functions described below using special-purpose hardware.

At 1805, the UE may receive a first search space configuration for monitoring a downlink control channel while operating in a low power mode of the UE. The operations of 1805 may be performed according to the methods described herein. In some examples, aspects of the operations of 1805 may be performed by a configuration signaling component as described with reference to FIGS. 9 through 12.

At 1810, the UE may receive a second search space configuration for monitoring the downlink control channel while operating in an active mode of the UE, where the second search space configuration is different from the first search space configuration. The operations of 1810 may be performed according to the methods described herein. In some examples, aspects of the operations of 1810 may be performed by a configuration signaling component as described with reference to FIGS. 9 through 12.

At 1815, the UE may monitor the downlink control channel according to the first search space configuration for a wakeup signal transmission based on the UE operating in the low power mode. The operations of 1815 may be performed according to the methods described herein. In some examples, aspects of the operations of 1815 may be performed by a monitoring component as described with reference to FIGS. 9 through 12.

Figure 19:
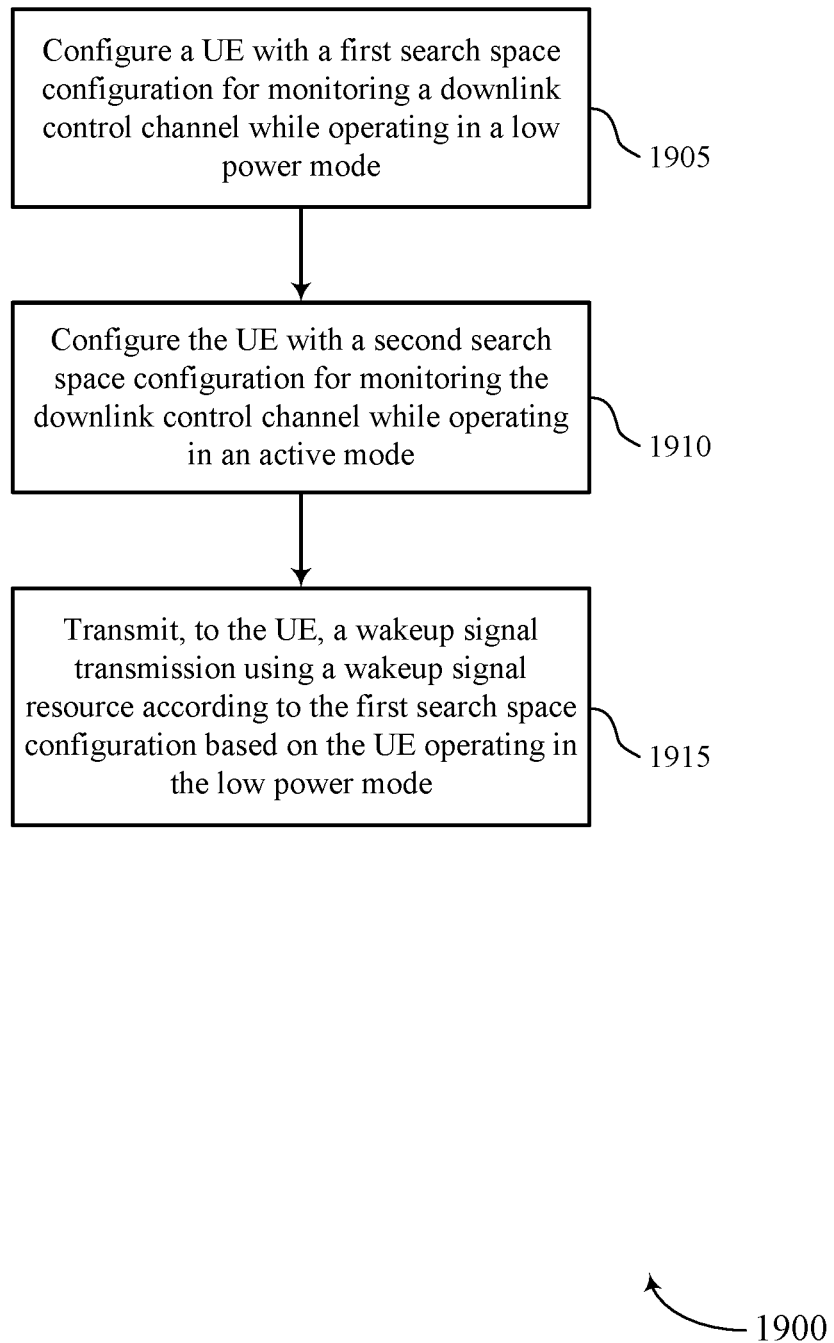

FIG. 19 shows a flowchart illustrating a method 1900 that supports wakeup signaling resource occasions in accordance with aspects of the present disclosure. The operations of method 1900 may be implemented by a base station 105 or its components as described herein. For example, the operations of method 1900 may be performed by a wakeup signaling configuration module as described with reference to FIGS. 13 through 16. In some examples, a base station may execute a set of instructions to control the functional elements of the base station to perform the functions described below. Additionally or alternatively, a base station may perform aspects of the functions described below using special-purpose hardware.

At 1905, the base station may configure a UE with a first search space configuration for monitoring a downlink control channel while operating in a low power mode. The operations of 1905 may be performed according to the methods described herein. In some examples, aspects of the operations of 1905 may be performed by a configuration signaling component as described with reference to FIGS. 13 through 16.

At 1910, the base station may configure the UE with a second search space configuration for monitoring the downlink control channel while operating in an active mode, where the second search space configuration is different from the first search space configuration. The operations of 1910 may be performed according to the methods described herein. In some examples, aspects of the operations of 1910 may be performed by a configuration signaling component as described with reference to FIGS. 13 through 16.

At 1915, the base station may transmit, to the UE, a wakeup signal transmission using a wakeup signal resource according to the first search space configuration based on the UE operating in the low power mode. The operations of 1915 may be performed according to the methods described herein. In some examples, aspects of the operations of 1915 may be performed by a wakeup signal transmission component as described with reference to FIGS. 13 through 16.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for wireless communications at a user equipment (UE), comprising:
   one or more processors;
   one or more memories coupled with the one or more processors; and
   instructions stored in the one or more memories and executable by the one or more processors to cause the apparatus to:
   receive, using a first receiver, control signaling indicating a configuration that configures the UE to monitor, via a plurality of wakeup signal resources, for one or more sequences for initiating a wakeup procedure,
   wherein the UE refrains from monitoring for the one or more sequence according to the configuration based at least in part on the UE operating in an active mode; and
   monitor, using a second receiver associated with a wakeup subsystem of the UE based at least in part on the UE operating outside the active mode, for the one or more sequences via the plurality of wakeup signal resources according to the configuration, wherein the second receiver is different from the first receiver and the one or more sequences comprises a wakeup signal for the UE.

2. The apparatus of claim 1, wherein the instructions are further executable by the one or more processors to cause the apparatus to:
   receive, using the second receiver associated with the wakeup subsystem of the UE, the wakeup signal based at least in part on the monitoring; and
   enter the active mode based at least in part on the received wakeup signal.

3. The apparatus of claim 2, wherein the wakeup signal comprises a scrambling sequence, and the instructions are further executable by the one or more processors to cause the apparatus to:
   decode the wakeup signal based at least in part on the scrambling sequence, wherein the entering the active mode is further based at least in part on the decoding the wakeup signal.

4. The apparatus of claim 1, wherein the instructions are further executable by the one or more processors to cause the apparatus to:
   enter a low power mode outside the active mode; and
   activate the second receiver associated with the wakeup subsystem of the UE based at least in part on the entering the low power mode, wherein the monitoring uses the second receiver associated with the wakeup subsystem of the UE based at least in part on the activating the second receiver.

5. The apparatus of claim 1, wherein the second receiver associated with the wakeup subsystem of the UE operates using a lower power than the first receiver.

6. The apparatus of claim 1, wherein the instructions are further executable by the one or more processors to cause the apparatus to:
   operate in a discontinuous reception (DRX) mode, wherein the active mode corresponds to an active duration for the DRX mode.

7. The apparatus of claim 1, wherein the control signaling configures the UE with a time resource, a frequency resource, or both for a respective wakeup signal resource of the plurality of wakeup signal resources.

8. The apparatus of claim 1, wherein the instructions are further executable by the one or more processors to cause the apparatus to:
   fail to receive, using the second receiver associated with the wakeup subsystem of the UE, the wakeup signal based at least in part on the monitoring; and
   refrain from entering the active mode based at least in part on the failing to receive the wakeup signal.

9. The apparatus of claim 1, wherein:
   the wakeup subsystem supports wakeup signal reception and decoding at the UE outside the active mode; and
   the second receiver associated with the wakeup subsystem comprises a low power receiver, a low complexity receiver, a simple correlator, or a combination thereof.

10. A method for wireless communications at a user equipment (UE), comprising:
    receiving, using a first receiver, control signaling indicating a configuration that configures the UE to monitor, via a plurality of wakeup signal resources, for one or more sequences for initiating a wakeup procedure,
    wherein the UE refrains from monitoring for the one or more sequences according to the configuration based at least in part on the UE operating in an active mode; and
    monitoring, using a second receiver associated with a wakeup subsystem of the UE based at least in part on the UE operating outside the active mode, for the one or more sequences via the plurality of wakeup signal resources according to the configuration, wherein the second receiver is different from the first receiver and the one or more sequences comprises a wakeup signal for the UE.

11. The method of claim 10, further comprising:
receiving, using the second receiver associated with the wakeup subsystem of the UE, the wakeup signal based at least in part on the monitoring; and
entering the active mode based at least in part on the received wakeup signal.

12. The method of claim 11, wherein the wakeup signal comprises a scrambling sequence, the method further comprising:
decoding the wakeup signal based at least in part on the scrambling sequence, wherein the entering the active mode is further based at least in part on the decoding the wakeup signal.

13. The method of claim 10, further comprising:
entering a low power mode outside the active mode; and
activating the second receiver associated with the wakeup subsystem of the UE based at least in part on the entering the low power mode, wherein the monitoring uses the second receiver associated with the wakeup subsystem of the UE based at least in part on the activating the second receiver.

14. The method of claim 10, wherein the second receiver associated with the wakeup subsystem of the UE operates using a lower power than the first receiver.

15. The method of claim 10, further comprising:
operating in a discontinuous reception (DRX) mode, wherein the active mode corresponds to an active duration for the DRX mode.

16. The method of claim 10, wherein the control signaling configures the UE with a time resource, a frequency resource, or both for a respective wakeup signal resource of the plurality of wakeup signal resources.

17. The method of claim 10, further comprising:
failing to receive, using the second receiver associated with the wakeup subsystem of the UE, the wakeup signal based at least in part on the monitoring; and
refraining from entering the active mode based at least in part on the failing to receive the wakeup signal.

18. The method of claim 10, wherein:
the wakeup subsystem supports wakeup signal reception and decoding at the UE outside the active mode; and
the second receiver associated with the wakeup subsystem comprises a low power receiver, a low complexity receiver, a simple correlator, or a combination thereof.

19. An apparatus for wireless communications at a user equipment (UE), comprising:
means for receiving, using a first receiver, control signaling indicating a configuration that configures the UE to monitor, via a plurality of wakeup signal resources, for one or more sequences for initiating a wakeup procedure,
wherein the UE refrains from monitoring for the one or more sequences according to the configuration based at least in part on the UE operating in an active mode; and
means for monitoring, using a second receiver associated with a wakeup subsystem of the UE based at least in part on the UE operating outside the active mode, for the one or more sequences via the plurality of wakeup signal resources according to the configuration, wherein the second receiver is different from the first receiver and the one or more sequences comprises a wakeup signal for the UE.

20. The apparatus of claim 19, further comprising:
means for receiving, using the second receiver associated with the wakeup subsystem of the UE, the wakeup signal based at least in part on the monitoring; and
means for entering the active mode based at least in part on the received wakeup signal.

* * * * *